United States Patent [19]

Weger

[11] 4,202,260
[45] May 13, 1980

[54] AUTOMATIC SANDWICH MAKING APPARATUS

[76] Inventor: Arland D. Weger, Box 382, Colbert, Okla. 74733

[21] Appl. No.: 936,647

[22] Filed: Aug. 24, 1978

[51] Int. Cl.² .................. A21C 9/04; B32B 31/04
[52] U.S. Cl. ............................ 99/450.4; 222/368; 401/5
[58] Field of Search ............ 99/450.1, 450.4, 450.5, 99/450.7, 450.8, 494; 221/303; 222/368, 258, 195; 401/5, 147, 208, 209; 126/19 M, 299 R, 275 E, 120

[56] References Cited

U.S. PATENT DOCUMENTS

| | | | |
|---|---|---|---|
| 1,022,774 | 4/1912 | DeJulio | 222/368 |
| 1,835,641 | 12/1931 | Finfrock | 222/368 |
| 2,581,848 | 1/1952 | Ettl | 401/5 |
| 3,183,856 | 5/1965 | Jolly | 99/450.4 |
| 3,329,080 | 7/1967 | Reach | 221/258 |
| 3,855,912 | 12/1974 | Schoonmaker et al. | 99/450.4 |
| 3,859,904 | 1/1975 | Carriazo | 99/450.4 |
| 3,994,274 | 11/1976 | Mannd | 126/120 |

Primary Examiner—Harvey C. Hornsby
Assistant Examiner—Timothy F. Simone
Attorney, Agent, or Firm—Dunlap, Codding & McCarthy

[57] ABSTRACT

An apparatus for automatically making sandwiches consisting of an upper and lower breadpiece with foodstuff disposed therebetween. The apparatus comprises an upper and a lower support with a lower and an upper breadpiece dispenser and a foodstuff dispenser connected to the upper support. A sandwich station is formed on the lower support and the apparatus is movable to a lower breadpiece dispensing station wherein a lower breadpiece is dispensed on the sandwich station. The apparatus also is movable to a foodstuff dispensing station wherein foodstuff is dispensed from the foodstuff dispenser onto the lower breadpiece, movable to an upper breadpiece dispensing wherein an upper breadpiece is disposed on the lower breadpiece with the foodstuff disposed therebetween, and movable to a discharge station wherein the sandwich disposed on the sandwich station is moved to a sandwich discharge position.

30 Claims, 18 Drawing Figures

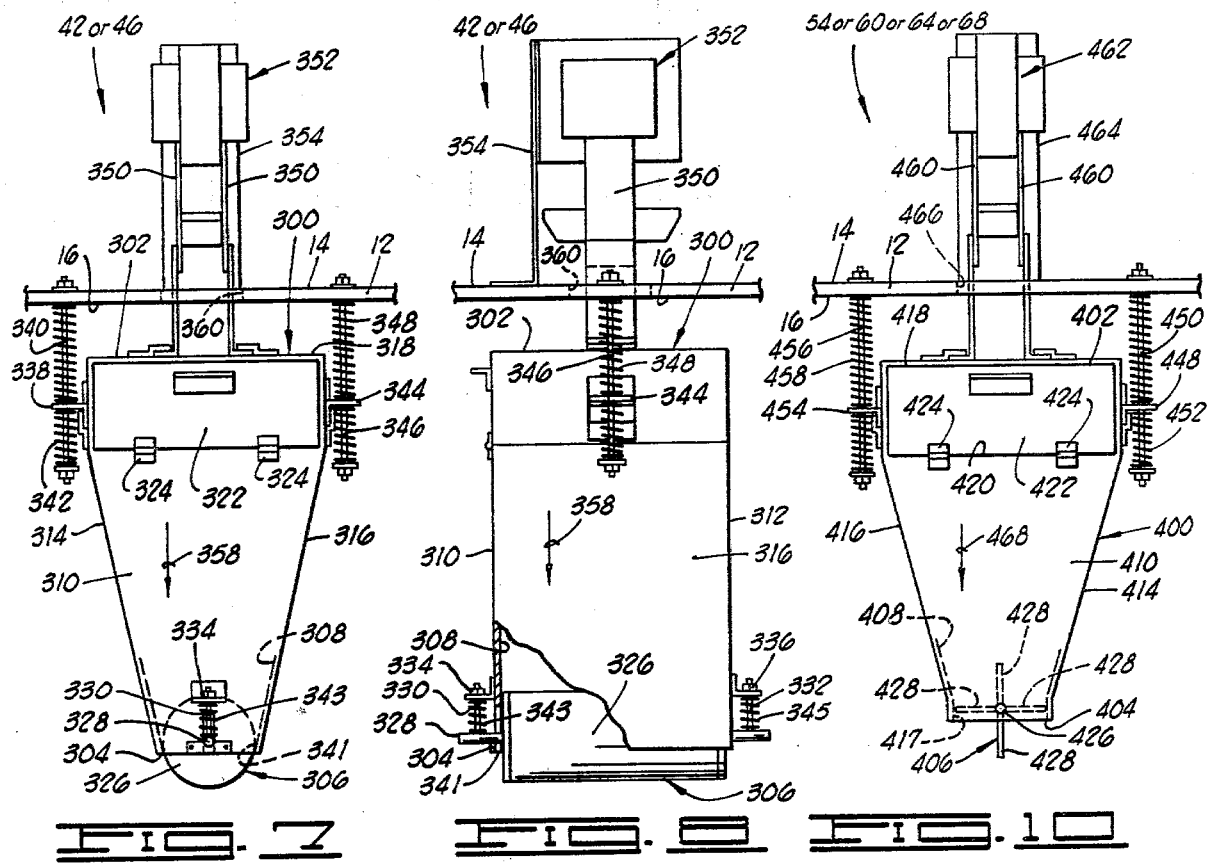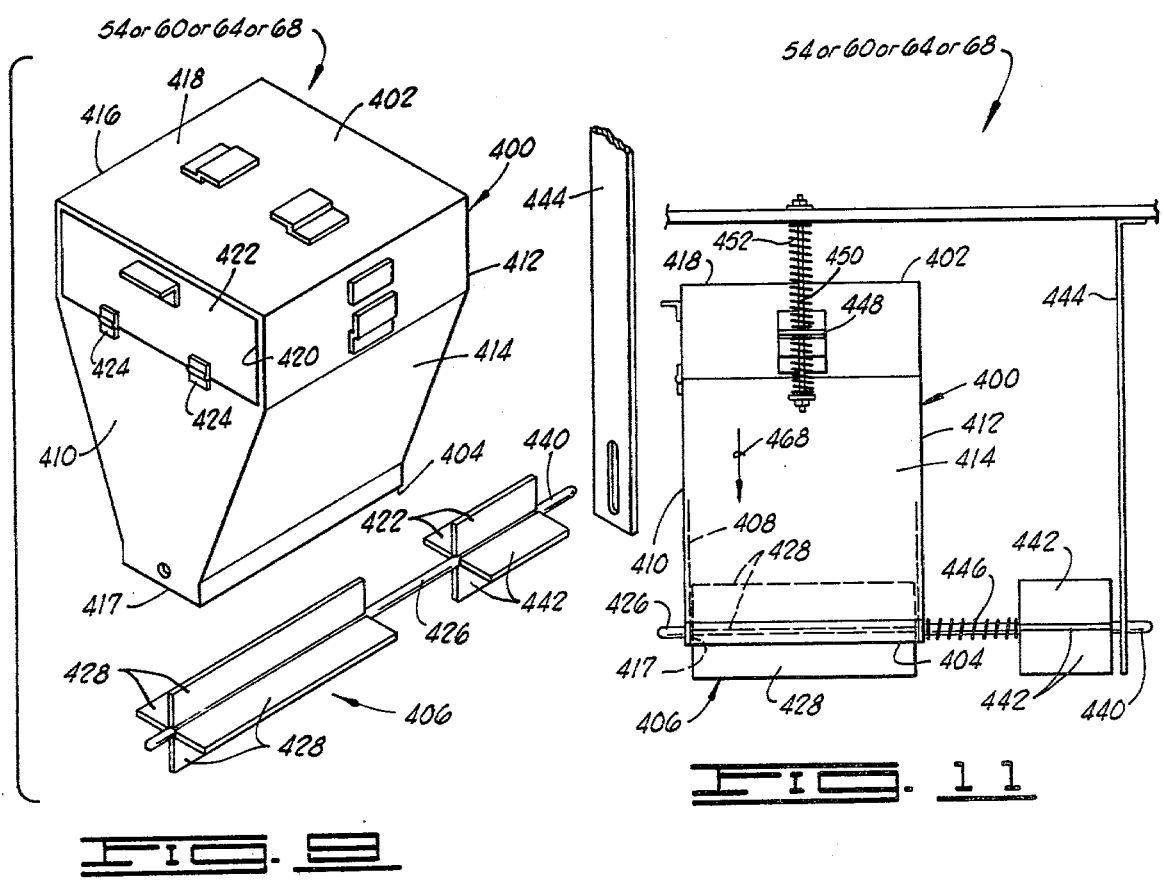

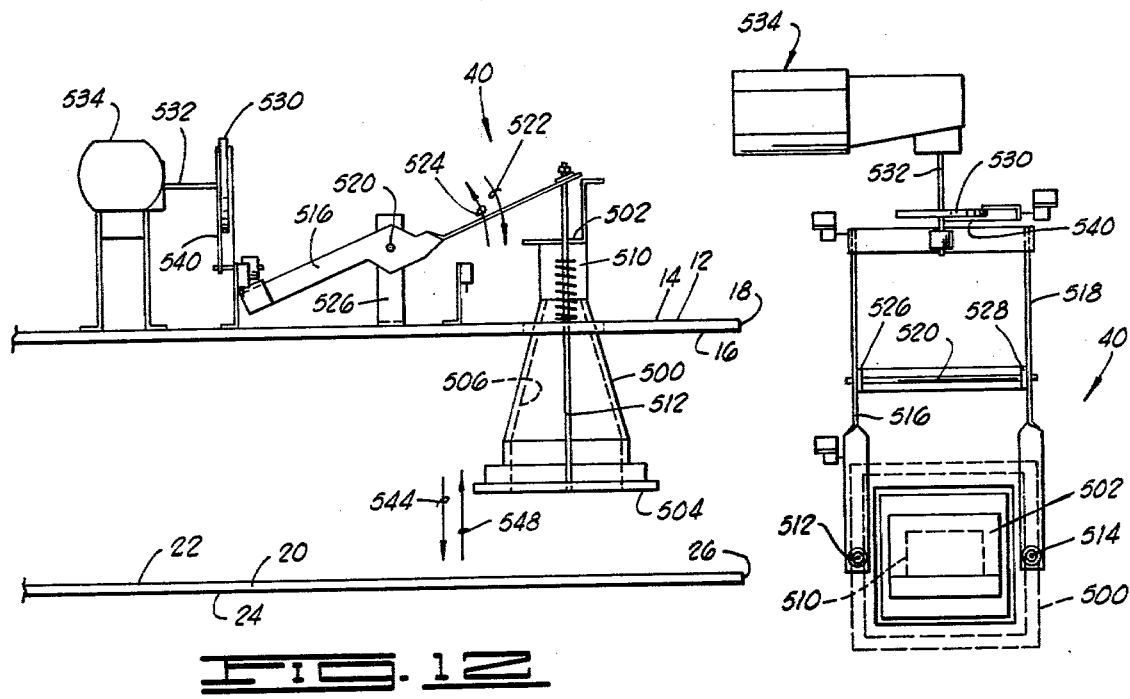
FIG. 12
FIG. 13
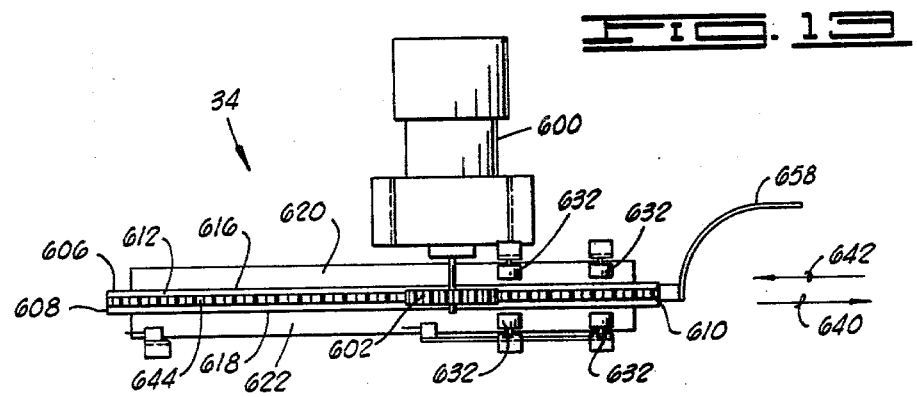
FIG. 14
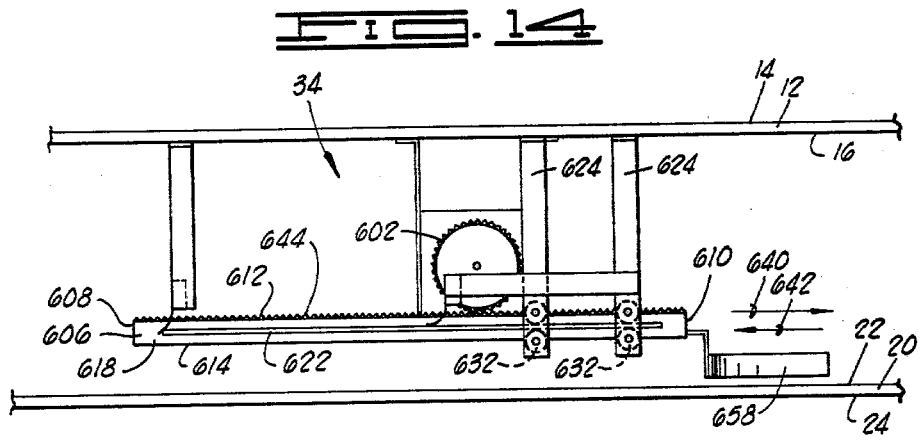
FIG. 15

U.S. Patent   May 13, 1980   Sheet 5 of 5   4,202,260
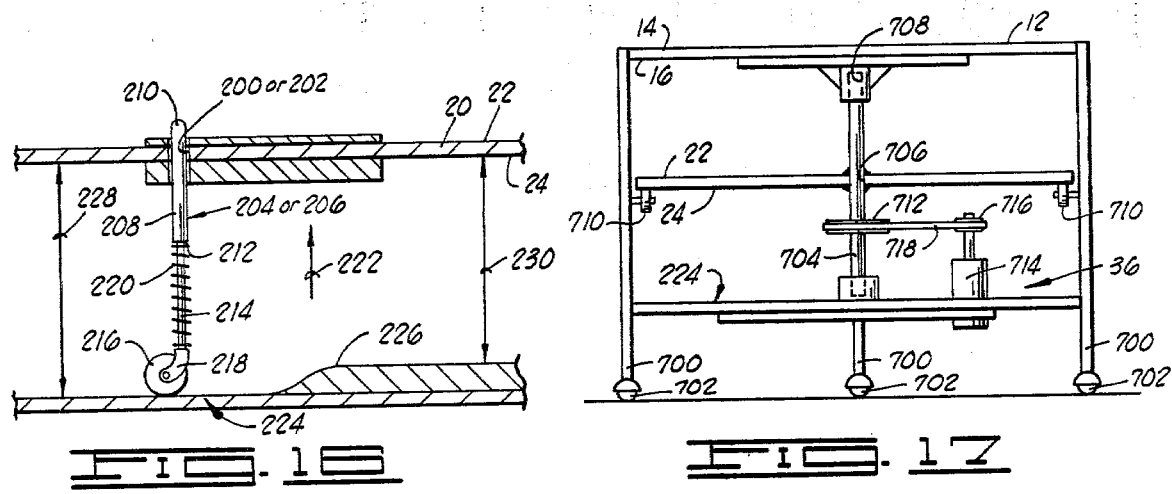
FIG. 16
FIG. 17
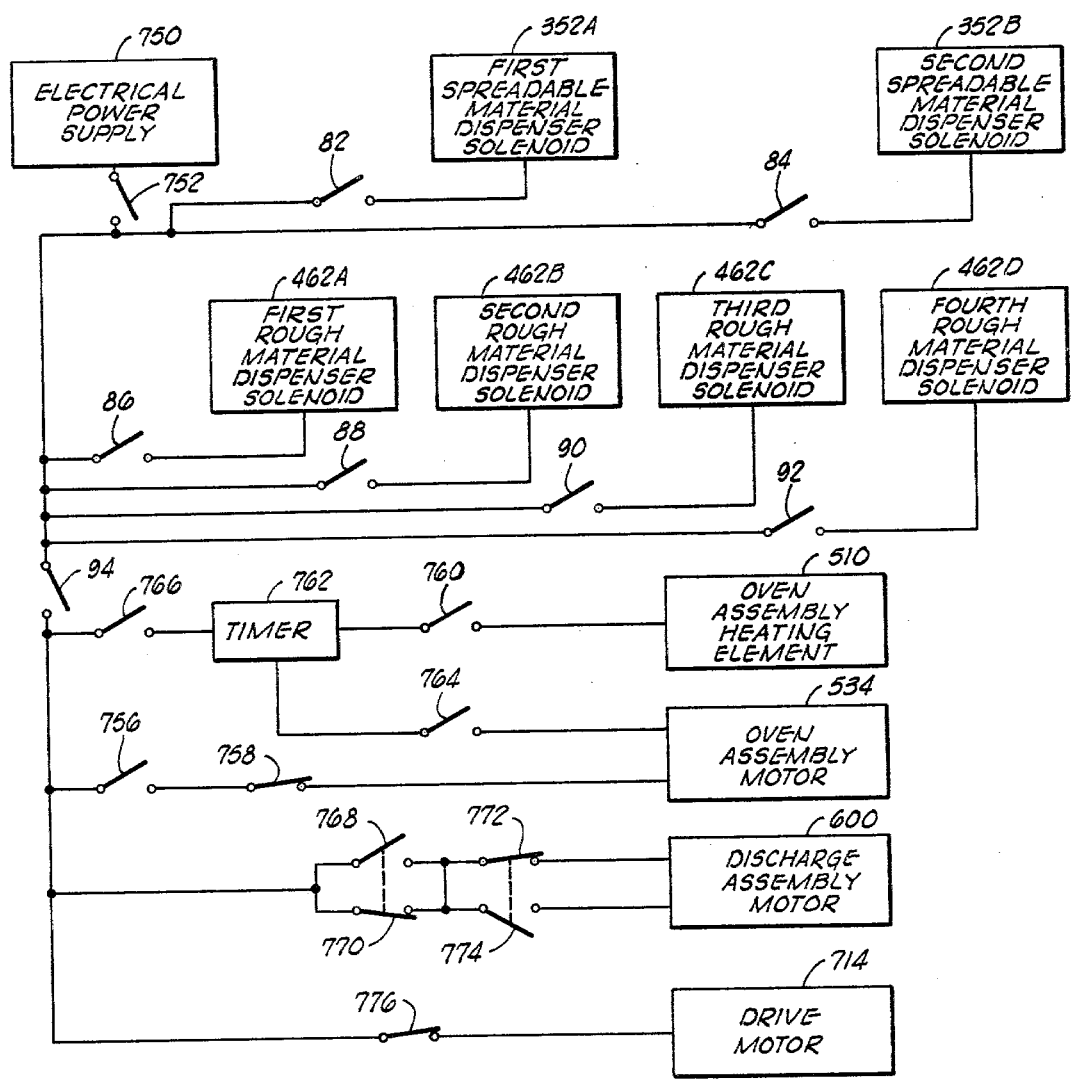
FIG. 18

AUTOMATIC SANDWICH MAKING APPARATUS

BACKGROUND OF THE INVENTION

Field of the Invention

The present invention relates generally to apparatus for automatically making food products and, more particularly, but not by way of limitation, to an apparatus for automatically making sandwiches consisting of an upper and a lower breadpiece with foodstuff disposed therebetween.

BRIEF DESCRIPTION OF THE DRAWINGS

FIG. 7 is a side elevation view of the spreadable material dispenser of FIG. 6.

FIG. 8 is a front elevational view of the spreadable material dispenser of FIG. 6.

FIG. 9 is a perspective view of a typical rough material dispenser utilized in the apparatus of FIGS. 1 and 2.

FIG. 10 is a side elevational view of the rough material dispenser of FIG. 9.

FIG. 11 is a front elevational view of the rough material dispenser of FIG. 9.

FIG. 12 is a side elevational view of the oven assembly utilized in the apparatus of FIGS. 1 and 2.

FIG. 13 is a plan view of the oven assembly of FIG. 12.

FIG. 14 is a plan view of the discharge assembly utilized in the apparatus of FIGS. 1 and 2.

FIG. 15 is a side elevational view of the discharge assembly of FIG. 14.

FIG. 16 is a side elevational, partial cross-sectional view showing a typical pin assembly utilized in connection with the breadpiece and the filler material dispensers.

FIG. 17 is a side elevational view, similar to FIG. 2, but showing mainly the drive assembly of the present invention.

FIG. 18 is a diagrammatic, schematic view of the control system of the present invention.

DESCRIPTION OF THE PREFERRED EMBODIMENT

Figure 1:
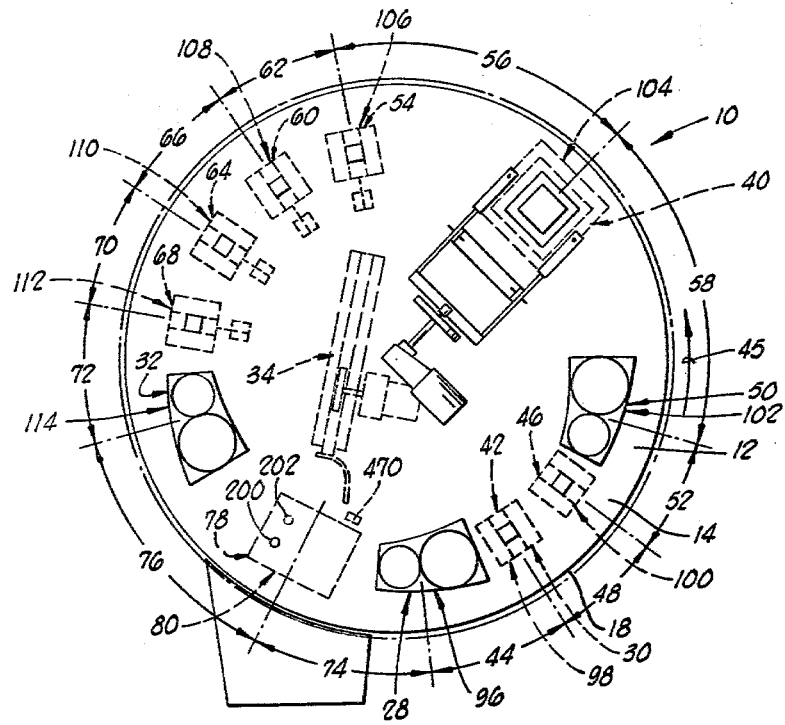
FIG. 1 is a top, plan view of the automatic sandwich making apparatus of the present invention.
Figure 2:
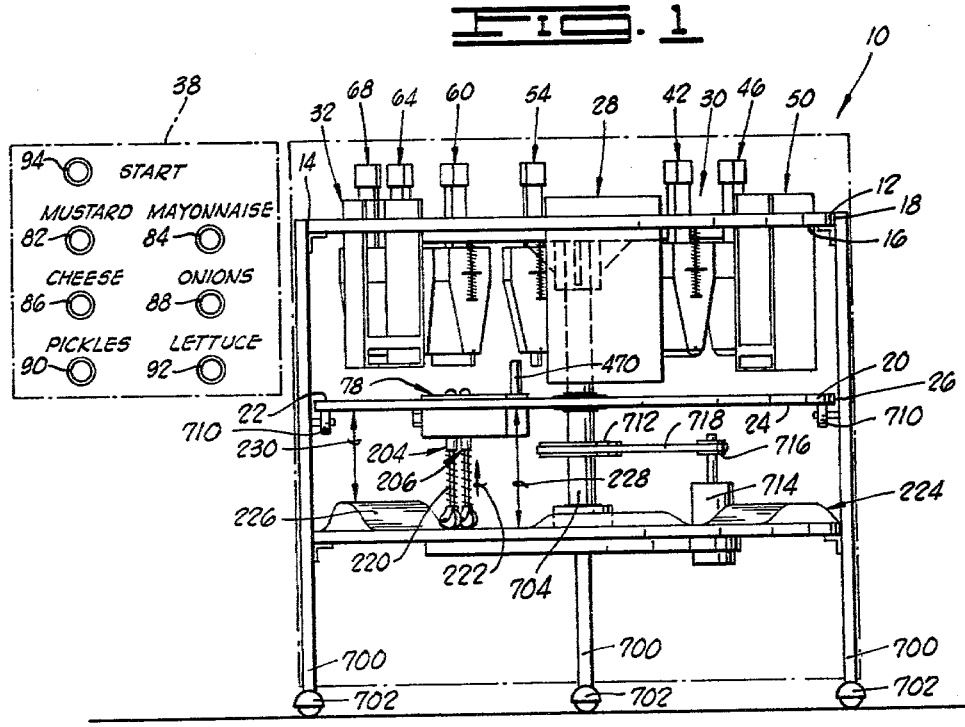
FIG. 2 is a side, elevation view of the apparatus of FIG. 1.

Referring to the drawings in general and to FIGS. 1 and 2 in particular, shown therein and designated via the general reference numeral 10 is an automatic sandwich making apparatus constructed in accordance with the present invention. The apparatus 10 generally includes: a circularly shaped upper support 12, having an upper surface 14, a lower surface 16 and an outer peripheral edge 18; a lower support 20, having an upper surface 22, a lower surface 24 and an outer peripheral edge 26, the upper support 12 being disposed generally above the lower support 20 with the lower surface 16 generally facing and being spaced a distance from the upper surface 22; a lower breadpiece dispenser 28 which is connected to the upper support 12 and includes a portion which is formed for retaining a plurality of upper breadpieces, one of the lower breadpieces being dispensable from the lower breadpiece dispenser 28 in one condition; a foodstuff dispenser 30, which is connected to the upper support 12 and spaced a distance from the lower breadpiece dispenser 28, the foodstuff dispenser having a portion which is formed for retaining foodstuff and being adapted to dispense a portion of the foodstuff retained therein in a dispensing condition; an upper breadpiece dispenser 32 which is connected to the upper support 12 and spaced a distance from the foodstuff dispenser 30, the upper breadpiece dispenser 30 having a portion which is formed for retaining a plurality of upper breadpieces and one of the upper breadpieces being dispensable from the upper breadpiece dispenser 30 in one condition; a discharge assembly 34 for moving a sandwich to a sandwich discharge position in a discharge condition of the discharge assembly 34; a drive assembly 36 for moving one of the upper support 12 and the lower support 20 to predetermined operating stations during the operation of the apparatus 10, and a control unit 38. In the embodiment of the invention shown in the drawings, the apparatus 10, more particularly, is constructed to automatically make a sandwich of the type generally characterized as a "hamburger" consisting of a lower breadpiece or bun-half and an upper breadpiece or bun-half with a meat pattie disposed between the upper and the lower breadpieces, the hamburger type sandwich also including such foodstuffs as mustard or mayonnaise, cheese, onions, pickles and lettuce, for example. In this embodiment of the invention, the apparatus 10 also includes an oven assembly 40 which is connected to the upper support 12 and spaced a distance from the lower breadpiece dispenser 28 for emitting heat in a heating condition thereof and the foodstuff dispenser 30, more particularly, includes: a first spreadable material dispenser 42 which is connected to the upper support 14 and spaced an arcuate distance 44 in a first direction 45 from the lower breadpiece dispenser 28; a second spreadable dispenser 46 which is connected to the upper support 12 and spaced an arcuate distance 48 in the first direction 45 from the first spreadable material dispenser 42, the second spreadable material dispenser 46 being spaced the sum of the distances 44 and 48 from the lower breadpiece dispenser 28; a filler material dispenser 50 which is connected to the upper support 12 and spaced an arcuate distance 52 in the first direction 45 from the second spreadable material dispenser 46, the filler material dispenser 50 being spaced the sum of the distance 44, 48 and 52 from the lower breadpiece dispenser 28; a first rough material dispenser 54 which is connected to the upper support 12 and spaced an arcuate distance 56 from the oven assembly 40, the over assembly 40 being spaced an arcuate distance 58 from the filler material dispenser 50 and the first rough material dispenser 54 being spaced the sum of the distances 44, 48, 52, 58 and 56 in the first direction 45 from the lower breadpiece dispenser 28; a second rough material dispenser 60 which is connected to the upper support 12 and spaced an arcuate distance 62 in the first direction 45 from the first rough material dispenser 54, the second rough material dispenser 60 being spaced the sum of the arcuate distances 44, 48, 52, 58, 56 and 62 from the lower breadpiece dispenser 28; a third rough material dispenser 64 which is connected to the upper support 12 and spaced an arcuate distance 66 in the first direction 45 from the second rough material dispenser 60, the third rough material dispenser 64 being spaced the sum of the distances 44, 48, 52, 58, 56, 62 and 66 from the lower breadpiece dispenser 28; and a fourth rough material dispenser 68 which is connected to the upper support 12 and spaced an arcuate distance 70 in the first direction 45 from the third rough material dispenser 64, the fourth rough material dispenser 68 being spaced the sum of the distances 44, 48, 52, 58, 56, 62, 66 and 70 from the lower breadpiece dispenser 28. Further, in this embodiment, the upper breadpiece dispenser 32 is connected to the upper support 12 and spaced an arcuate distance 72 in the first direction 45 from the fourth rough material dispenser 68, the upper breadpiece dispenser 32 being spaced the sum of the distances 44, 48, 52, 58, 56, 62, 66, 70 and 72 from the lower breadpiece dispenser 28. As shown in FIG. 1, the discharge assembly 34 is disposed generally between the lower and the upper breadpiece dispensers 28 and 32 with a discharge assembly 34 being spaced an arcuate distance 74 from the upper breadpiece dispenser 32 and spaced an arcuate distance 76 in the first direction 45 from the lower breadpiece dispenser 28, although it should be noted that the discharge assembly 34 also in one sense is spaced the sum of the distances 44, 48, 52, 58, 56, 62, 66, 70, 72, 74 and 76 in the first direction 45 from the lower breadpiece dispenser 28.

The first and the second spreadable material dispensers 42 and 46 are each constructed in a similar manner and each spreadable material dispenser 42 and 46 includes a portion which is adapted to retain filler material and each spreadable material dispenser 42 and 46 dispenses a portion of the filler material retained therein in a dispensing condition. For the purpose of describing the present invention, it is assumed that the first spreadable material dispenser 42 has spreadable material in the form of mustard retained therein, and the second spreadable material dispenser 46 has spreadable material in the form of mayonnaise retained therein.

The filler material dispenser 50 has a portion adapted to retain filler material and the filler material dispenser 50 cooperates for dispensing one of the filler material pieces retained therein in a dispensing condition thereof. In the embodiment of the invention when the apparatus 10 is constructed to make a sandwich in the form of a hamburger, the filler material dispenser 50 retains a plurality of frozen hamburger patties and is constructed to cooperate in dispensing one of the hamburger patties in a dispensing condition thereof during the operation of the apparatus 10.

The rough material dispensers 54, 60, 64 and 68 are each constructed in a similar manner and each of the rough material dispensers 54, 60, 64 and 68 includes a portion adapted to retain a quantity of rough material, each rough material dispenser 54, 60, 64 and 68 being constructed to dispense a portion of the rough material retained therein in a dispensing condition thereof. In the example embodiment of the invention wherein the apparatus 10 is constructed to make a hamburger type sandwich, the first rough material dispenser 54 is assumed to be filled with grated cheese type rough material, the second rough material dispenser 60 is assumed to be filled with chopped onion type rough material, the third rough material dispenser 64 is assumed to be filled with chopped pickle type rough material and the fourth rough material dispenser 68 is assumed to be filled with chopped lettuce type rough material.

The lower support 20 has a sandwich station 78 which is constructed to support the portions of the sandwich being made during the operation of the apparatus 10. In the start position of the apparatus 10, the sandwich station 78 is disposed at a discharge station 80, as shown in FIG. 1, wherein the sandwich station 78 is disposed in an operative relationship with respect to the discharge assembly 34.

The control unit 38 includes a plurality of select buttons 82, 84, 86, 88, 90 and 92 and a start button 94. The select button 82 is operatively connected to the first spreadable material dispenser 42 and, in this particular operative embodiment of the invention, the select button 82 is labeled "mustard" in FIG. 2. The select button 84 is operatively connected to the second spreadable material dispenser 46 and, in this operative embodiment of the invention, the select button 84 is labeled "mayonnaise" in FIG. 2. The select button 86 is operatively connected to the first rough material dispenser 54 and, in this operative embodiment of the invention, the select button 86 is labeled "cheese" in FIG. 2. The select button 88 is operatively connected to the second rough material dispenser 60 and, in this operative embodiment of the invention, the select button 88 is labeled "onions" in FIG. 2. The select button 90 is operatively connected to the third rough material dispenser 64 and, in this operative embodiment of the invention, the select button 90 is labeled "pickles" in FIG. 2. The select button 92 is operatively connected to the fourth rough material dispenser 68 and, in this operative embodiment of the invention, the select button 92 is labeled "lettuce" in FIG. 2. The start button 94 is operatively connected to the drive assembly 36 and other components of the control unit, the start button 94 being operatively connected to initiate the operation of the apparatus 10 for making the desired sandwich.

During the operation of the apparatus 10, the control unit 38 and the various components connected thereto initially are activated or placed in a select condition. The apparatus 10 may be automatically placed in the select condition after the sandwich has been made and discharged therefrom or in one other embodiment, the apparatus 10 may be placed in a select condition in response to a predetermined amount of money being deposited in a coin receptacle (not shown). In any event, after the apparatus 10 has been placed in the select condition, the individual or operator then can select the food items which the operator desires to be included on a particular sandwich. For example, assume the operator desires a hamburger sandwich with mustard, cheese and lettuce, then, the operator depresses the mustard select button 82, the cheese select button 86 and the lettuce select button 92 while the apparatus 10 is in the select condition. After depressing the appropriate, desired select buttons, then the operator depresses the start button 94 to initiate the making of the hamburger sandwich via the apparatus 10. The drive assembly 36 is connected to the lower support 20 for drivingly rotating the lower support 20 in the first direction 45 in an activated condition of the drive assembly 36. In response to the depression of the start button 94, the drive assembly 36 causes the lower support 20 to be rotatingly driven in the first direction 45.

The lower support 20 is rotatingly driven in the first direction 45 through the arcuate distance 74 to a position wherein the sandwich station 78 is disposed generally at a lower breadpiece dispensing station 96, the sandwich station 78 being disposed relative to the lower breadpiece dispenser 28 in a predetermined position for receiving a lower breadpiece dispensed froom the lower breadpiece dispenser 28. The apparatus 10 is constructed to automatically dispense one lower breadpiece onto the sandwich station 78 as the sandwich station 78 on the lower support 20 moves through the lower breadpiece dispensing station 96.

After the lower breadpiece has been dispensed onto the sandwich station 98, (sometimes referred to herein as the first spreadable material dispensing station) the drive assembly 36 continues to rotate the lower support 20 in the first direction 45 to a first foodstuff dispensing station 98, the first spreadable material dispenser 42 being disposed in a predetermined position relative to the sandwich station 78 on the lower support 20 in the first foodstuff dispensing station 98. The first spreadable material dispenser 42 is constructed to dispense a predetermined amount of foodstuff (mustard) onto the lower breadpiece which is disposed on the sandwich station 78 as the sandwich station 78 moves through the first foodstuff dispensing station 98.

After the sandwich station 78 has moved through the first foodstuff dispensing station 98, the drive assembly 36 continues to drivingly rotate the lower support 20 in the first direction 45 through a second foodstuff dispensing station 100 (sometimes referred to herein as the second spreadable material dispensing station) to a third foodstuff dispensing station 102 (sometimes referred to herein as a filler material dispensing station) wherein the filler material dispenser 50 is disposed in a predetermined position with respect to the sandwich station 78 on the lower surface 20, the filler material (frozen hamburger patty) being dispensed from the filler material dispenser 50 onto the lower breadpiece location on the sandwich station 78 as the sandwich station 78 passes through the third foodstuff dispensing station 102.

After the filler material (frozen hamburger patty) is dispensed onto the lower breadpiece, the drive assembly 36 continues to drive the lower support 20 in the first direction 45 to a heating station 104 wherein the sandwich station 78 on the lower support 20 is disposed generally below the oven assembly 40. In this position of the apparatus 10, the oven assembly 40 is disposed in a predetermined position relative to the sandwich station 78 on the lower support 20 so the oven assembly 40 can operate to emit heat within the area generally near the sandwich station 78. After the sandwich station 78 has been moved to the heating station 104, the oven assembly 40 is activated to emit heat in the area generally near the sandwich station 78 thereby causing the filler material (frozen hamburger patty) and the lower breadpiece to be heated for a predetermined heating period of time.

After the portion of the sandwich disposed on the sandwich station 78 has been heated by the oven assembly 40 for the predetermined heating period of time, the drive assembly 36 drivingly moves the lower support 20 in the first direction 45 to a fourth foodstuff dispensing station 106 (sometimes referred to herein as the first rough material dispensing station) wherein the sandwich station 78 on the lower support 20 is disposed in a predetermined position with respect to the first rough material dispenser 54. As the sandwich station 78 moves through the fourth foodstuff dispensing station 106, the first rough material dispenser 54 dispenses foodstuff (shredded cheese) onto the filler material (hamburger patty) disposed on the sandwich station 78.

After the rough material (shredded cheese) has been dispensed onto the sandwich portion via the first rough material dispenser 54, the drive assembly 36 drivingly moves the lower support in the first direction 45 through a fifth foodstuff dispensing station 108 (sometimes referred to herein as the second rough material dispensing station) and through a sixth foodstuff dispensing station 110 (sometimes referred to herein as the third rough material dispensing station) to a seventh foodstuff dispensing station 112 (sometimes referred to herein as the fourth rough material dispensing station). The sandwich station 78 on the lower support 20 is disposed in a predetermined position with respect to the fourth rough material dispenser 68 in the seventh foodstuff dispensing station 112 and, as the sandwich station 78 moves through the seventh foodstuff dispensing station 112, rough material (chopped lettuce) is dispensed onto the sandwich portion disposed on the sandwich station 78.

After the foodstuff (chopped lettuce) is disposed onto the sandwich via the fourth rough material dispenser 68, the drive assembly 36 drivingly moves the lower support 20 in the first direction 45 to an upper breadpiece dispensing station 114. In the upper breadpiece dispensing station 114, the sandwich station 78 on the lower support 20 is disposed in a predetermined position with respect to the upper breadpiece dispenser 32 so that one upper breadpiece or bun-half is disposed onto the sandwich located on the sandwich station 78 as the sandwich station 78 moves through the upper breadpiece dispensing station 114 in the first direction 45.

When the upper breadpiece or bun-half has been disposed onto the sandwich located on the sandwich station 78, the sandwich as ordered by the operator has been completed or made and the drive assembly 36 drivingly moves the lower support 20 in the first direction 45 to a position wherein the sandwich station 78 is disposed at the discharge station 80. At the discharge station 80, the sandwich station 78 is located in a predetermined position with respect to the discharge assembly 34 and, in this position, the discharge assembly 34 is activated to move the sandwich located on the sandwich station 78 to a sandwich discharge position or, in other words, to discharge the sandwich from the apparatus 10.

It will be apparent from the foregoing that the hamburger sandwich made by the apparatus 10 includes those foodstuff ingredients selected by the operator utilizing the select buttons 82, 84, 86, 88, 90 and 92, and that the entire hamburger sandwich has been made automatically via the apparatus 10.

In addition to the select buttons depressed by the operator in the foregoing example, the operator also could have depressed select button 84 indicating the operator desired to have mayonnaise on the hamburger sandwich, the select button 88 indicating the operator desired to have onions on the hamburger sandwich and select button 90 indicating the operator desired to have pickles on the hamburger sandwich. When the select button 84 is depressed, the drive assembly 36 drives the lower support 20 in the first direction 45 to the second foodstuff dispensing station 100 wherein the second spreadable material dispenser 46 is disposed in a predetermined position relative to the sandwich station 78 on the lower support 20 and, in this position, the second spreadable material dispenser dispenses foodstuff (mayonnaise) onto the sandwich portion which is located on the sandwich station 78 as the sandwich station 78 is moved through the second foodstuff dispensing station 100. When the select button 88 is depressed, the drive assembly 36 moves the lower support 20 to a position wherein the second rough material dispenser 60 is disposed in a predetermined position with respect to the sandwich station 78 on the lower support 20 and, in this position, the second rough material dispenser 60 dispenses a predetermined portion of rough material (onions) onto the sandwich portion located on the sandwich station 78 as the sandwich station 78 moves through the fifth foodstuff dispensing station 108. When the select button 90 is depressed the drive assembly 36 moves the lower support 20 to the sixth foodstuff dispensing station 110 and, in this position, the sandwich station 78 on the lower support 20 is disposed in a predetermined position with respect to the third rough material dispenser 64 and the third rough material dispenser 64 dispenses a predetermined portion of rough material (pickles) onto the sandwich portion located on the sandwich station 78 as the sandwich station 78 moves through the sixth foodstuff dispensing station 110.

With respect to the foregoing example wherein the apparatus 10 is constructed to automatically make a hamburger sandwich, the lower breadpiece 28 is automatically conditioned to dispense one of the lower breadpieces retained therein onto the sandwich station 78 as the sandwich station 78 moves through the lower breadpiece dispensing station 96, and the filler material dispenser 50 is automatically conditioned in a dispensing position to dispense the rough material (one hamburger patty) onto the portion of the sandwich located on the sandwich station 78 as the sandwich station 78 moves through the third foodstuff dispensing station 102. Further, the oven assembly 40 is automatically conditioned via the control unit 38 in a heating condition to emit heat generally near the sandwich station 78 as the sandwich station 78 moves into the heating station 104 and the upper breadpiece dispenser 28 is automatically conditioned via the control unit 38 to dispense one upper breadpiece onto the portion of the sandwich located on the sandwich station 78 as the sandwich station 78 moves through the upper breadpiece dispensing station 114. Thus, in this particular embodiment of the invention, each hamburger sandwich would automatically include an upper and a lower breadpiece with filler material (one hamburger patty) disposed therebetween and heated via the oven assembly 40. The remaining ingredients to be included on a hamburger sandwich made via the apparatus 10 would depend upon the particular select buttons 82, 84, 86, 88, 90 and 92 selectively depressed via the operator.

BREADPIECE FILLER MATERIAL DISPENSERS

Figure 3:
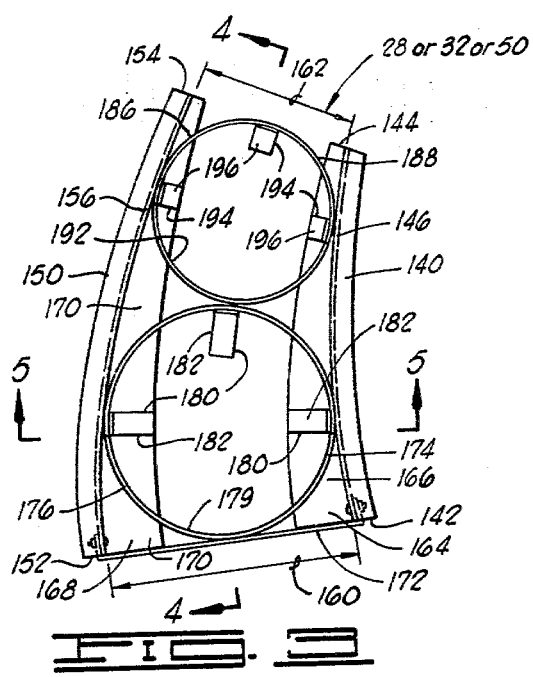
FIG. 3 is a top view of a typical upper or lower breadpiece dispenser or filler material dispenser utilized in the apparatus of FIGS. 1 and 2.
Figure 4:
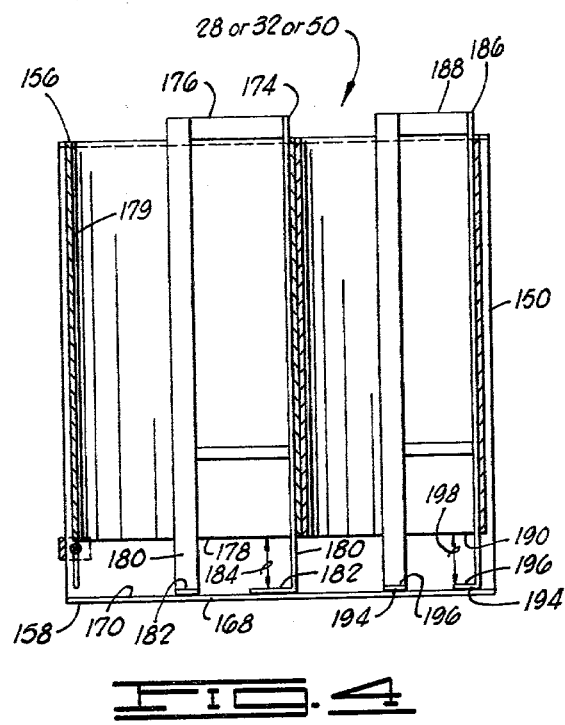
FIG. 4 is a view taken substantially along the lines 4—4 of FIG. 3.
Figure 5:
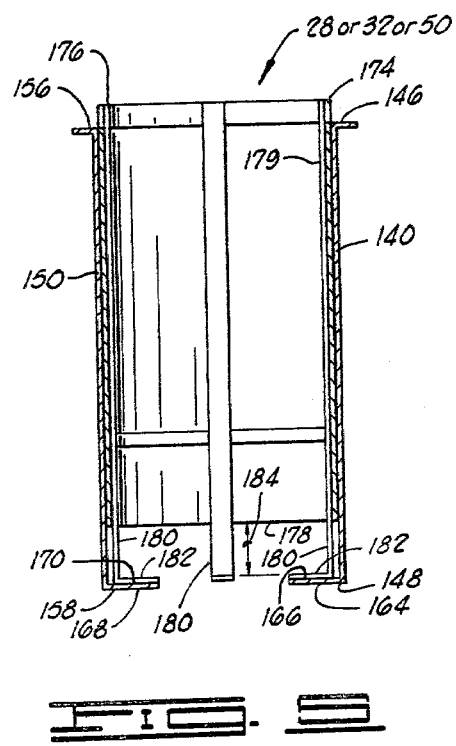
FIG. 5 is a view taken substantially along the lines 5—5 of FIG. 3.

The lower and the upper breadpiece dispensers 28 and 32 and the filler material dispenser 50 are identical in construction and a breadpiece dispenser 28 or 32 or 50 is shown in greater detail in FIGS. 3, 4 and 5. Each dispenser 28 and 32 and 50 includes a first panel 140 having a front end 142, a back end 144, an upper end 146 and a lower end 148, and a second panel 150 having a front end 152, a back end 154, an upper end 156 and a lower end 158.

The first and the second panels 140 and 150 are each formed on a curve extending between the front end and the back end of the respective panel. The second panel 150 is spaced a distance from the first panel 140 and the first and the second panels 140 and 150 are each formed on a curve such that a distance 160 extending between the panels 140 and 150 generally near the front ends 142 and 152 are greater than a distance 162 extending between the panels 140 and 150 generally near the back ends 144 and 154.

A flange 164 is formed on the lower end 148 of the first panel 140, the flange 164 extending a distance generally perpendicular from the panel 140 in a direction generally toward the second panel 150, thereby providing an upwardly facing surface 166. A flange 168 is formed on the lower end 158 of the second panel 150 and the flange 168 extends generally perpendicularly from the second panel 150 in a direction generally toward the first panel 140 thereby providing an upwardly facing surface 170. The flange 164 extends generally between the front end 142 and the back end 144 of the first panel 140 and the flange 168 extends generally between the front end 152 and the back end 154 of the second panel 150.

A brace member 172 is connected to the panels 140 and 150, one end of the brace member 172 being connected to the first panel 140 generally near the front end 142 thereof and the opposite end of the brace member 172 being connected to the second panel 150 generally near the front end 152 thereof. The brace member 172 cooperates to structurally support the panels 140 and 150 in a predetermined spaced apart relationship.

A first cylindrically shaped retainer 174 is disposed between the first and the second panels 140 and 150 generally near the front ends 142 and 152. The first retainer 174 has an upper end 176, a lower end 178 and an opening 179 extending therethrough intersecting the upper and the lower ends 176 and 178. The retainer 174 is disposed in the opening between the first and the second panels 140 and 150.

Three flanges 180 (sometimes referred to herein as first, second and third flanges) are connected to the first retainer 174, one end of each flange 180 being secured to the lower end 148 of the retainer 174 and each flange 180 extending a distance from the lower end 148 of the retainer 174. The end of each flange 180, opposite the end of the flange 180 which is connected to the first retainer 174, is formed at an angle thereby providing an upwardly facing ledge 182. The upwardly facing ledges 182 are each disposed or spaced a predetermined distance 184 below the lower end 178 of the first retainer 174. The distance 184 is slightly greater than the thickness of the one of the breadpieces or filler material pieces, as the case may be, disposed within the first retainer 174 and less than the thickness of two of the breadpieces or filler material pieces so that, when a plurality of breadpieces or filler material pieces are disposed within the opening 179, a portion of one face of the lowermost breadpiece or filler material piece engages the ledges 182 formed via the flanges 180, the lowermost breadpiece or filler material piece being supported in the dispenser on the ledges 182 with the remaining breadpieces or filler material pieces resting on the lowermost breadpiece or filler material piece and being disposed generally within the opening 179 of the first retainer 174. The flanges 180 are circumferentially spaced about the lower end 178 of the first retainer 174 such that the spaces between the flanges 180 and between the lower end 178 and the upwardly facing ledges 182 cooperate to form a dispensing passageway extending through a portion of the dispenser.

A second cylindrically shaped retainer 186 is disposed between the first and the second panels 140 and 150 generally near the front ends 142 and 152. The second retainer 186 has an upper end 188, a lower end 190 and an opening 192 extending therethrough intersecting the upper and the lower ends 188 and 190. The retainer 186 is disposed in the opening between the first and the second panels 140 and 150.

Three flanges 194 are connected to the second retainer 186, one end of each flange 194 being secured to the lower end 190 of the retainer 186 and each flange 194 extending a distance from the lower end 190 of the retainer 186. The end of each flange 194, opposite the end of the flange 194 which is connected to the retainer 186, is formed at an angle thereby providing an upwardly facing ledge 196. The upwardly facing ledges 196 are each disposed or spaced a predetermined distance 198 below the lower end 190 of the retainer 186. The distance 198 is slightly greater than the thickness of the one of the breadpieces or filler material pieces, as the case may be, disposed within the retainer 186 and less than the thickness of two of the breadpieces or filler material pieces so that, when a plurality of breadpieces or filler material pieces are disposed within the opening 192, a portion of one face of the lowermost breadpiece or filler material piece engages the ledges 196 formed via the flanges 194, the lowermost breadpiece or filler material piece being supported in the dispenser on the ledges 196 with the remaining breadpieces or filler material pieces resting on the lowermost breadpiece or filler material piece and being disposed generally within the opening 192 of the retainer 186. The flanges 194 are circumferentially spaced about the lower end 190 of the retainer 186 such that the spaces between the flanges 194 and between the lower end 190 and the upwardly facing ledges 196 cooperate to form a dispensing passageway extending through a portion of the dispenser.

In an assembled position, the first retainer 174 is disposed between the panels 140 and 150, and positioned such that the flanges 180 engage the upwardly facing ledges 166 and 170, the ledges 166 and 170 cooperating to support the first retainer 174 between the panels 140 and 150. By the same token, the second retainer 186 is disposed between the panels 140 and 150 and positioned such that the flanges 194 engage the upwardly facing ledges 166 and 170 for supporting the retainer 186 between the panels 140 and 150.

The opening 179 of the first retainer 174 has a larger diameter than the opening 192 of the second retainer 186 for retaining breadpieces or filler material pieces of different sizes. In operation, a particular size breadpiece or filler material piece is selected and such breadpiece or filler material pieces then are disposed in the appropriate first or second retainer 174 or 186, i.e. breadpieces or filler material pieces are disposed only in one of the retainers 174 or 186 for making a particular size or diameter sandwich. Also, the retainers 174 or 186 may have a generally square shape cross section or some other shape in those appropriate instances.

As shown more clearly in FIGS. 1 and 16, a pair of openings 200 and 202 are formed through the lower support 20, each of the openings 200 and 202 intersecting the upper and the lower surfaces 22 and 24 of the lower support 20. A portion of a first pin assembly 204 (FIG. 2) is disposed within a portion of the opening 200 and a portion of a second pin assembly 206 (FIG. 2) is disposed within a portion of the opening 202.

The first and the second pin assemblies 204 and 206 are identical in construction and, as shown in FIG. 16, each pin assembly 204 and 206 includes a cylindrically shaped pin member 208 having opposite ends 210 and 212, a rod 214 having one end telescopingly connected to the end 212 of the pin member 208, the rod 214 extending a distance from the pin member 208. A cam roller 216 is rollingly connected to the pin member 208, via a connector 218. A spring 220 is disposed about the rod 214 with one end of the spring 220 abutting the end 212 of the pin member 208 and the opposite end of the spring 220 abutting the connector 218. The spring 220 cooperates to bias the pin member 208 in a direction 222 to a position wherein the pin member 208 is disposed near the end of the rod 214, opposite the end of the rod 214 which is connected to the connector 218.

A cam track 224, having a cam surface 226 formed on a portion thereof, is supported a distance below the lower support 20. The cam track 224 is shaped and supported such that the cam track surface 226, more particularly, is spaced a distance 228 from the lower surface 24 of the lower support 20 at some positions and such that the cam surface 226 is disposed a distance 230 from the lower surface 24 of the lower support 20 at some other positions along the cam track 224. More particularly, the cam track 224 is shaped such that the cam surface 226 is supported the distance 228 from the lower surface 24 of the lower support 20 at all positions along the cam track 224 except at the lower breadpiece dispensing station 96, the filler material dispensing station 102 and the upper breadpiece dispensing station 114, the cam track 224 being supported such that the cam surface 226 is spaced the distance 230 from the lower surface 24 of the lower support 20 at the lower breadpiece dispensing station 96, the filler material dispensing station 102 and at the upper breadpiece dispensing station 114.

The cam roller 216 rollingly engages the cam surface 226 during the operation of the apparatus 10 and the first and the second pin assemblies 204 and 206 each extend generally between the cam track 224 and the lower support 20. During the operation and when the cam roller 216 is supported on portions of the cam surface 226 which are spaced the distance 228 from the lower surface 24 of the lower support 20, the pin member 208 of the first pin assembly 204 extends through a portion of the opening 200 to a position wherein the upper end 210 of the pin member 208 is disposed immediately below the upper surface 22 of the lower support 20 and the pin member 208 of the second pin assembly 206 extends through a portion of the opening 202 to a position wherein the upper end 210 of the second pin assembly 206 is disposed immediately below the upper surface 22 of the lower support 20. In this position, the first and the second pin assemblies 204 and 206 are supported in an upright position by engagement of the cam rollers 216 on the cam surface 226 and the retaining of the pin members 208 within the openings 200 and 202 in the lower support 20.

When the lower support 20 is moved to either the lower breadpiece dispensing station 96 of the filler material dispensing station 102 or the upper breadpiece dispensing station 114, the first and the second pin assemblies 204 and 206 are each moved into engagement with the portions of the cam surface 226 disposed the distance 230 below the lower surface 24 of the lower support 20. In this position, the pin member 208 of the first pin assembly 204 is moved in the direction 222 upwardly through the opening 200 to a position wherein the upper end 210 extends a distance above the upper surface 22 of the lower support 20 and the pin member 208 of the second pin assembly 206 is moved in the direction 222 upwardly through the opening 202 to a position wherein the upper end 210 is disposed a distance above the upper surface 22 of the lower support 20. Thus, when the lower support 24 has been moved to either the lower breadpiece dispensing station 96 or the filler material dispensing station 102 or the upper breadpiece dispensing station 114 portions of the pin members 208 of the first and the second pin assemblies 204 and 206 each extend a distance above the upper surface 22, the pin members 208 each being positioned in a dispensing position in this position of the pin members 208.

In the dispensing position of the dispensers 28, 32 and 50, portions of the pin members 208, near the upper ends 210 thereof, are disposed generally within the dispensing passageways of the dispensers 28, 32 and 50 in the dispensing position of the pin members 208. In the dispensing position of the pin assemblies 204 and 206, the pin members 208 extending into the dispensing passageways, engage one of the breadpieces or filler material pieces and move the engaged breadpiece or filler material piece from the dispenser onto the sandwich station 78 on the lower support 20 as the sandwich station 78 moves through the dispensing station 96 or 102 or 114.

SPREADABLE MATERIAL DISPENSER

Figure 6:
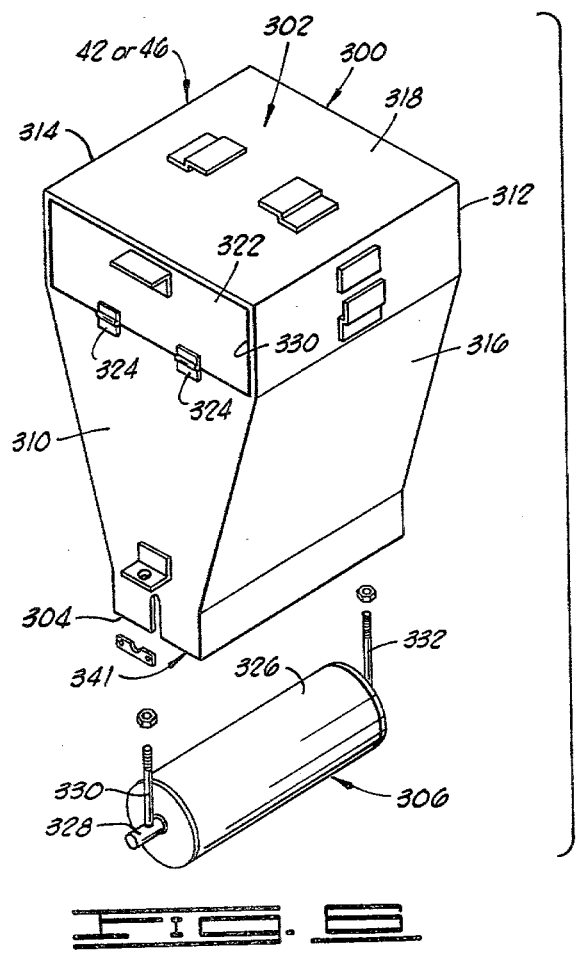
FIG. 6 is a perspective view of a typical spreadable material dispenser utilized in the apparatus of FIGS. 1 and 2.

A typical spreadable material dispenser 42 or 46 are shown in greater detail in FIGS. 6, 7 and 8. The first and the second spreadable material dispensers 42 and 46 are identical in construction and each includes a bin 300, having an upper end 302 and a lower end 304, which is connected to the upper support 12, and a cylindrically shaped roller 306 which is generally supported on the bin 300 generally near the lower end 304. An opening 308 extends through the bin 300 intersecting the upper and the lower ends 302 and 304 and forming an interior space within the bin 300. The spreadable material is disposed and retained within the opening 308 during the operation of the apparatus 10.

The bin 300 is constructed of a plurality of side panels 310, 312, 314 and 316 and a top panel 318. The panels 310, 312, 314, 316 and 318 are connected to substantially encompass the interior space formed via the opening 308, thereby cooperating to substantially enclose and encompass the interior portion of the bin 300. Each of the panels 310, 312, 314 and 316 is tapered inwardly from the upper end 302 toward the lower end 304 such that the opening 308 is larger generally near the upper end 302 with respect to the size of the opening 308 generally near the lower end 304.

A top panel 318 is connected to one end of each of the panels 310, 312, 314 and 316 and the top panel 318 is sized to encompass the opening 308 generally near the upper end 302, thereby essentially closing the upper end 302 of the bin 300.

A door opening 320 is formed through a portion of the panel 310 generally near the upper end 302 and a door panel 322 is hingedly connected to the panel 310 via a pair of hinge members 324. The door panel 322 is sized and disposed on the panel 310 such that in the closed position of the door panel 322, the door panel 322 substantially encompasses and closes the door opening 320 and, in the open position of the door panel 322, access is provided via the door opening 320 to the interior space within the bin 300. During the operation of the apparatus 10, the spreadable material is disposed or loaded into the interior space in the bin 300 via the door opening 320.

The roller 306 includes a cylindrically shaped roll member 326 which is journally supported on a shaft 328, the shaft 328 extending axially through the roll member 326 and portions of the shaft 328 extend a distance from each end of the roll member 326. One end of a first rod 330 is movably or slidably extended through a portion of the shaft 328 generally near one end of the roll member 326 and one end of a second rod 332 is movably or slidably extended through one end portion of the shaft 328 generally near the opposite end of the roll member 326. The rod 330 is securely connected to the panel 310 via a fastener 334 and the rod 332 is securedly connected to the panel 312 via a fastener 336.

The opening 308 through the lower end 304 of the bin 300 forming a discharge opening 341. The width of the discharge opening 341 is slightly larger than the diameter of the roll member 326 and the length of the discharge opening 341 is slightly larger than the length of the roll member 326 to provide a minimum clearance between the pin 300 and the roll member 326 to prevent leakage of the spreadable material from within the interior space in the bin 300 through the discharge opening 341.

The rods 330 and 332 cooperate to support the roll member 326 in a predetermined position such that a portion of the roll member 326 is disposed within the discharge opening 341 generally near the lower end 304 and such that a portion of the roll member 326 extends a distance beyond the lower end 304 of the bin 300. The portions of the roll member 326, which are disposed within the opening 308, are exposed to and engaged by the spreadable material retained within the interior space in the bin 300. Thus, when the roll member 326 is rotated, the spreadable material dispensed on the portions of the outer peripheral surface of the roll member 326 which are disposed within the interior space in the bin 300 is moved from within the interior space in the bin 300 to a position wherein such spreadable material is disposed on portions of the roll member 326 which are spaced a distance from the lower end 304 of the bin 300. In other words, when the roll member 326 is rotated, spreadable material is disposed on the outer peripheral surface of the roll member 326 and moved via the roll member from within the interior of the bin 300 to an exterior position for rolling the spreadable material onto a sandwich portion.

A first spring 343 is disposed about the rod 330 with one end of the spring 343 engaging the bin 300 generally at the fastener 334 and the opposite end of the spring 343 engaging the shaft 328. A second spring 345 is disposed about the rod 332 with one end of the spring 345 engaging the bin 300 generally at the fastener 334 and the opposite end of the spring 345 engaging the shaft 328. The springs 343 and 345 cooperate with the rods 330 and 332 to support the shaft 328 in a manner such that the springs 343 and 345 bias the shaft 328 in a first downwardly direction generally toward the lower support 20 and such that the roll member 326 can be moved a limited distance in the downwardly direction and in a second upwardly direction during the engagement between the sandwich portion on the sandwich station 78 and the roll member 326. The springs 343 and 345 cooperate to support the roll member 326 in a manner permitting limited movement of the roll member 326 in the upwardly and downwardly direction to provide for an even application of the spreadable material onto the sandwich portion via the roll member 326 during the operation.

A flange 338 is connected to the side panel 314 and extends a distance therefrom. The flange 338 has an opening (not shown) formed therethrough and a support rod 340 is disposed through the opening in the flange 338. One end of the support rod 340 is secured to the upper support 12 and the support rod 340 extends a distance from the lower surface 16 of the upper support 12 generally toward the lower support 20, a portion of the support rod 340 extending through the opening in the flange 338. A compression spring 342 is disposed about the support rod 340 with one end of the compression spring 342 engaging the flange 338 and the opposite end of the compression spring 342 engaging a portion of the support rod 340 generally near the end of the support rod 340 opposite the end which is secured to the upper support 12.

Another flange 344 is connected to the panel 316 generally near the upper end 302 and the second flange 344 extends a distance from the panel 316. One end of a support rod 346 is secured to the upper support 12 and the rod 346 extends a distance from the lower surface 16 of the upper support 12 generally toward the lower support 20, a portion of the support rod 346 extending through an opening (not shown) in the flange 344. A compression spring 348 is disposed about the support rod 346 and one end of the compression spring 348 engages the flange 344, the opposite end of the compression spring 348 engaging the upper support 12.

The support rods 340 and 346 and the compression springs 342 and 348 cooperate to support the bin 300 in a predetermined position generally between the upper support 12 and the lower support 20 such that the lowermost portion of the outer peripheral surface of the roll member 326 is disposed a predetermined distance above the upper surface 22 of the lower support 20 in a non-operative position of the bin 300.

The compression springs 342 and 348 cooperate to permit the bin 300 to be moved slight distances in the downwardly direction and in a generally opposite upwardly direction during the operation of the apparatus 10. The springs 342 and 348 operate to cushion the dispenser when the dispenser is moved from the non-operative to a dispensing position.

One end of each of a pair of supports 350 is connected to the panel 318 of the bin 300 and each of the supports 350 extends a distance generally perpendicularly from the panel 318, the supports 350 being spaced a distance apart. A solenoid 352 is connected to one end portion of a member 354. The member 354 is connected to the upper surface 14 of the upper support 12 and extends a distance generally upwardly therefrom for supporting the solenoid 352 in a predetermined position above the upper surface 14.

The supports 350 extend through an opening 360 formed through the upper support 12 and the solenoid 352 is operatively connected to one end portion of the supports 350, generally opposite the ends of the supports 350 which are connected to the bin 300. Thus, the solenoid 352 cooperates with the support rods 340 and 346 to support the bin 300 in a predetermined position with respect to the lower support 20. More particularly, in a de-energized condition or position of the solenoid 352, the bin 300 is supported in the non-operative position wherein the lowermost portion of the outer peripheral surface of the roll member 326 is disposed a predetermined distance above the upper surface 22 of the lower support 20. In the energized condition or position of the solenoid 352, the solenoid 352 causes the supports 350 to be moved a predetermined distance in the downwardly direction 358, thereby causing the bin 300 to be moved in the direction 358 generally toward the upper surface 22 of the lower support 20 via the interconnection between the solenoid 352 and the bin 300. In the energized position of the solenoid 352, the bin 300 is moved to a dispensing position wherein the lowermost portion of the outer peripheral surface of the roll member 326 is supported a predetermined distance above the upper surface 22 of the lower support 20 for engaging a sandwich portion disposed on the sandwich station 78. Thus, the spreadable material within the bin 300 is rolled onto the portion of the sandwich disposed on the sandwich station 78 as the sandwich station 78 moves in the first direction 45 beneath the roll member 326 of the bin 300 in the dispensing position of the bin 300.

ROUGH MATERIAL DISPENSERS

The rough material dispensers 54, 60, 64 and 68 are identical in construction and a typical rough material dispenser 54 or 60 or 64 or 68 is shown in FIGS. 9, 10, and 11. Also, in one preferred embodiment, the rough material dispensers 54, 60, 64 and 68 are each constructed similar to the dispensers 42 and 46, except the rough material dispensers include a paddle wheel type dispensing element in lieu of the roll member type dispensing element utilized in the spreadable material dispensers 42 and 46.

The rough material dispensers 54, 60, 64 and 68 each include a bin 400, having an upper end 402 and a lower end 404, which is connected to the support support 12 and a paddle wheel 406 which is journally supported on the bin 400, generally near the lower end 404. An opening 408 is formed through the bin 400 intersecting the upper and the lower ends 402 and 404. The rough material is disposed and retained within the opening 408 during the operation of the apparatus 10.

The bin 400 is constructed of a plurality of side panels 410, 412, 414 and 416 and a top panel 418. The panels 410, 412, 414, 416 and 418 are connected to substantially encompass the interior space formed via the opening 408 thereby cooperating to substantially enclose and encompass the interior portion of the bin 400. Each of the panels 410, 412, 414 and 416 is tapered inwardly from the upper end 402 toward the lower end 404 such that the opening 408 is larger generally near the upper end 402 with respect to the size of the opening 408 generally near the lower end 404. The opening 408 extends through the lower end 404 of the bin 400 forming a discharge opening 417.

A top panel 418 is connected to one end of each of the panels 410, 412, 414 and 416 and the top panel 418 is sized to encompass the opening 408 generally near the upper end 402, thereby essentially closing the upper end 402 of the bin 400.

A door opening 420 is formed through a portion of the panel 410 generally near the upper end 402 and a door panel 422 is hingedly connected to the panel 410 via a pair of hinge members 424. The door panel 422 is sized and disposed on the panel 410 such that in the closed position of the door panel 422, the door panel 422 substantially encompasses and closes the door opening 420 and, in the open position of the door panel 422, access is provided via the door opening 420 to the interior space within the bin 400. During the operation of the apparatus 10, the spreadable material is disposed or loaded into the interior space in the bin 400 via the door opening 420.

The paddle wheel 406 includes an elongated shaft 426 which is journally supported on the bin 400 generally near the lower end 404. Four generally rectangularly shaped paddle members 428 are connected to the shaft 426. One end of each paddle member 428 is connected to the shaft 426 and each paddle member 428 extends a distance radially from the shaft 428. The paddle members 428 are spaced circumferentially about the shaft 428 and, in one preferred embodiment, the paddle members 428 are spaced at 90° intervals circumferentially about the shaft 426.

The paddle members 428 are sized and shaped with respect to the discharge opening 417 in a manner similar to the sizing of the roll member 426, described before, to provide a minimum clearance between the outer ends of the paddle members 428 and the portions of the bin 400 formed via the discharge opening 417 to substantially prevent inadvertent leakage of the rough material from within the interior space in the rough material dispensers during the operation of the apparatus 10.

A portion of the shaft 426 extends a distance beyond the bin 400 terminating with an end portion 440. Four actuating flanges 442 are connected to the shaft 426. The actuating flanges 442 are generally rectangularly shaped and one side of each of the actuating flanges 442 is secured to the shaft 426 and each actuating flange 442 extends a distance radially from the shaft 426 in a manner similar to that described before with respect to the paddle members 428. More particularly, the actuating flanges 442 are spaced circumferentially about the shaft 426, each of the actuating flanges 442 being spaced about 90° from the adjacent actuating flanges 442.

One end of a support member 444 is secured to the upper support 12 and the opposite end of the support member 444 is secured to the end portion 440 of the shaft 426, the support member 444 cooperating to support the shaft 426 in a predetermined position with respect to the lower support 20. A bias spring 446 is disposed about the shaft 426. One end of the bias spring 446 engages a portion of the actuating flanges 442 and the opposite end of the bias spring 446 engages the bin 400.

The width of the discharge opening 417 is slightly larger than the width of two of the paddle members 428 and the length of the discharge opening 417 is slightly larger than the length of the paddle members 428 to provide a minimum clearance between the pin 400 and the paddle members 428 to prevent the leakage of rough material from within the interior space in the bin through the discharge opening 417.

The paddle members 428 are supported in a predetermined position such that some of the paddle members 428 are disposed within the opening 408 generally near the lower end 404 and such that some of the paddle members 428 extend a distance beyond the lower end 404 of the bin 400. The paddle members 428 which are disposed within the opening 408, are exposed to and engaged by the rough material retained within the interior space in the bin 400. Thus, when the paddle members 428 are rotated on the shaft 426, the rough material dispensed on portions of the paddle members 428 which are disposed within the interior space in the bin 400 are moved from within the interior space in the bin 400 to a position wherein such rough material is dispensed from the bin 400. In other words, when the paddle members 428 are rotated, rough material is moved via the paddle members 428 from within the interior space in the bin 400 and dispensed onto a sandwich portion disposed on a sandwich station 78.

A flange 448 is connected to the first side panel 414 and extends a distance therefrom. The flange 448 has an opening (not shown) formed therethrough and a support rod 450 is disposed through the opening in the flange 448. One end of the support rod 450 is secured to the upper support 12 and the support rod 450 extends a distance from the lower surface 16 to the upper support 12 generally toward the lower support 20, a portion of the support rod 450 extending through the opening in the flange 448. A compression spring 452 is disposed about the support rod 450 with one end of the compression spring 452 engaging the flange 448 and the opposite end of the compression spring 452 engaging a portion of the support rod 450 generally near the end of the support rod 456 opposite the end which is secured to the upper support 12.

Another flange 454 is connected to the panel 416 generally near the upper end 404 and the second flange 454 extends a distance from the panel 416. One end of a support rod 456 is secured to the upper support 12 and the rod 456 extends a distance from the lower surface 16 of the upper support 12 generally toward the lower support 20, a portion of the support rod 456 extending through an opening (not shown) in the flange 454. A compression spring 458 is disposed about the support rod 456 and one end of the compression spring 458 engages the flange 454, the opposite end of the compression spring 458 engaging the upper support 12.

The support rods 450 and 456 and the compression springs 452 and 458 cooperate to support the bin 400 in a predetermined position generally between the upper support 12 and the lower support 20 such that the paddle members 428 and the activating flanges 442 are each disposed a predetermined distance above the upper surface 22 of the lower support 20 in a non-operative position of the bin 400.

One end of each of a pair of supports 460 is connected to the panel 418 of the bin 400 and each of the supports 460 extends a distance generally perpendicularly from the panel 418, the supports 460 being spaced a distance apart. A solenoid 462 is connected to one end portion of a member 464. The member 464 is connected to the upper surface 14 of the upper support 12 and extends a distance generally upwardly therefrom for supporting the solenoid 462 in a predetermined position above the upper surface 14.

The supports 460 extend through an opening 466 formed through the upper support 12 and the solenoid 462 is operatively connected to one end portion of the supports 460, generally opposite the ends of the supports 460 which are connected to the bin 400. Thus, the solenoid 462 cooperates with the support rods 450 and 456 to support the bin 400 in a predetermined position with respect to the lower support 20. More particularly, in a de-energized condition or position of the solenoid 462, the bin 400 is supported in the non-operative position wherein the lowermost portion of the paddle members 428 and the activating flanges 442 are disposed a predetermined distance above the upper surface 22 of the lower support 20. In the energized condition or position of the solenoid 462, the solenoid 462 causes the supports 460 to be moved a predetermined distance in the downwardly direction 468, thereby causing the bin 400 to be moved in the direction 468 generally toward the upper surface 22 of the lower support 20 via the interconnection between the solenoid 462 and the bin 400. In the energized position of the solenoid 462, the bin 400 is moved to a dispensing position wherein the lowermost portion of the paddle members 428 and the activating flanges 442 are supported a predetermined distance above the upper surface 22 of the lower support 20 for dispensing rough material onto a sandwich portion disposed on the sandwich station 78. Thus, the rough material within the bin 400 is dispensed onto the portion of the sandwich disposed on the sandwich station 78 as the sandwich station 78 moves in the first direction 45 beneath the paddle wheel 406 in the dispensing position of the bin 400.

One end of a bar 470 (shown in FIGS. 1 and 2) is connected to the upper surface 22 of the lower support 20 and the bar 470 extends a predetermined distance from the lower support 20 upwardly generally toward the upper support 12. The bar 470 is sized and positioned on the lower support 20 to engage one of the activating flanges 442 in the dispensing position of the bin 400 and as the lower support 20 is moved through the appropriate dispensing station. For example, assuming the solenoid 462 of the first rough material dispenser 54 de-energized thereby causing the bin 400 of the first rough material dispenser 54 to be moved in the direction 468 toward the lower support 20 to a dispensing position. In this dispensing position, the bar 470 will engage the activating flanges 442 when the lower support 20 is moved in the direction 45 to a position placing the sandwich station 78 in the fourth foodstuff dispensing station 108 thereby causing the activating flanges 442 to be rotated, the rotation of the flanges 442 causing the rotation of the shaft 426 and the paddle members 428 connected thereto. The rotation of the paddle members 428 causes rough material to be dispensed from the first rough material dispenser 54 onto the sandwich portion located on the sandwich station 78. In a like manner, the bar 470 engages the activating flanges 442 of the rough material dispensers 60, 64 and 66 when the sandwich station 78 moves through the dispensing stations 108, 110 and 112 in the dispensing position of the bins 400 of the dispensers 60, 64 and 66. When the bin 400 is in the non-operative position in the energized condition of the solenoids 462, the bin 400 is positioned a sufficient distance above the lower support 20 such that the bar 470 passes under without engaging the activating flanges 442 as the sandwich station 78 moves through the dispensing stations 106, 108, 110 and 112.

OVEN ASSEMBLY

As shown in FIGS. 12 and 13, the oven assembly 40 includes a hood 500 having an upper end 502 and a lower end 504. An opening 506 is formed through a portion of the hood 500, the opening 506 intersecting the lower end 504 of the hood 500 and extending a distance therethrough. An oven element 510 is secured within the opening 506, generally at the upper end 502, the oven element 510 being constructed to emit a predetermined amount of heat into and through the opening 506 in a heating condition of the oven element 510.

One end of a support rod 512 is secured to the hood 500 and the opposite end of the support rod 512 extends through an opening in the upper support 12, a portion of the support rod 512 extending a distance above the upper surface 14 of the upper support 12. One end of another support rod 514 is connected to the hood 500, generally near the lower end 504, a portion of the support rod 514 extending through an opening in the upper support 12 and a portion of the support rod 514 extending a distance above the upper surface 14 of the upper support 12.

The end of the support rod 512, opposite the end of the support rod 512 which is connected to the hood 500, is connected to one end of a lever arm 516. One end of the support rod 514, opposite the end of the support rod 514 which is connected to the hood 500, is connected to one end of a lever arm 518.

A shaft 520 extends through the mid-portions of the lever arms 516 and 518, the shaft 520 journally supporting the lever arms 516 and 518 for pivotal movement in a first pivotal direction 522 and a second pivotal direction 524. The shaft 520 is journally connected to a pair of spaced apart supports 526 and 528, each of the supports 526 and 528 being connected to the upper surface 14 of the upper support 12 and extending a distance therefrom to journally support the shaft 520 a predetermined distance above the upper surface 14.

A circularly shaped gear 530 is secured to one end of a shaft 532, the shaft 532 being operatively connected to a gear motor 534 such that the shaft 532 is rotated in a first rotational direction in one activated condition of the gear motor 534 and such that the shaft 532 is rotated in an opposite second rotational direction in one other activated condition of the gear motor 534. One end of an arm 540 is secured to a portion of the gear 530 and extends a distance generally perpendicularly therefrom, the opposite end of the arm 540 being rollingly connected to the ends of the lever arms 516 and 518, generally opposite the ends of the lever arms 516 and 518 which are connected to the support rods 512 and 514, respectively.

When the gear motor 534 is in one activated condition for rotating the gear 530 in the first rotational direction the lever arms 516 and 518 are each caused to move in the first pivotal direction 522 about the pivot axis provided by the shaft 520, thereby causing the hood 500 to be lowered in a downwardly direction 544 via the interconnection between the hood 500 and the lever arms 516 and 518. When the gear motor 534 is in the other activated condition, the gear 534 is caused to be rotated in the second rotational direction thereby causing the lever arms 516 and 518 to be moved in the pivotal direction about the pivot axis provided by the shaft 520, thereby causing the hood 500 to be raised in the generally upwardly direction 548 via the interconnection between the lever arms 516 and 518 and the hood 500.

DISCHARGE ASSEMBLY

The discharge assembly 34 is shown in more detail in FIGS. 14 and 15 and, as shown therein, the discharge assembly includes a reversible motor 600 having a gear 602 connected to the output shaft of the motor 600. A rectangularly shaped arm 606 is disposed beneath the gear 602, the arm 606 being disposed between the gear 602 and the upper surface 22 of the lower support 20. The arm 606 has opposite ends 608 and 610, an upper surface 612, a lower surface 614 and opposite sides 616 and 618.

A first wing 620 is connected to the side 616 of the arm 606, the first wing 620 extending a distance from the first side 616 and generally between the opposite ends 608 and 610. A second wing 622 is connected to the side 618 of the arm 606, the second wing 622 extending a distance from the second side 618 and extending generally between the opposite ends 608 and 610 of the arm 606.

One end of each of four support braces 624 (only two support braces 624 being shown in FIGS. 14 and 15) is secured to the lower surface 16 of the upper support 12 and each of the support braces 624 extends a distance from the upper support 12 generally toward the upper surface 22 of the lower support 20. A pair of rollers 632 is journally connected to the end of each of the support brace 624, opposite the end connected to the upper support 12.

The rollers 632 are positioned such that a portion of the first wing 620 is disposed generally between each of the pair of rollers 632 on two of the support braces 624. The rollers 632 are positioned such that a portion of the second wing 622 is disposed generally between the rollers 632 on the other two support braces 624. The rollers 632 rollingly engage the wings 620 and 622 and cooperate to support the arm 606 in a predetermined position above the upper surface 22 of the lower support 20 such that the arm 606 can be moved in a radially outwardly first direction 640 and in a radially inwardly second direction 642. The rollers 632 each rollingly engage a portion of either the first wing 620 or the second wing 622 as the arm 606 is moved in the first direction 640 or in the second direction 642 during the operation of the apparatus 10.

A gear track 644 is secured to the upper surface 612 of the arm 606, the gear track 644 extending generally between the opposite ends 608 and 610 of the arm 606. The gear 602 and the arm 606 are each supported and positioned such that the gear 602 meshingly engages the gear track 604 in an assembled position of the discharge assembly 34. Thus, in one activated condition of the motor 600, the gear 602 is rotated in one direction causing the arm 606 to be moved in the first direction 640 via the meshing engagement between the gear 602 and the gear track 644 and, in one other activated condition of the motor 600, the gear 602 is rotated in an opposite direction causing the arm 606 to be moved in the second direction 642 via the meshing engagement between the gear 602 and the gear track 644.

One end of a sandwich engaging member 658 is secured to the arm 606, generally near the end 610 thereof. In this embodiment of the invention, the sandwich engaging member 658 is formed on a curve and the sandwich engaging member 658 is shaped and positioned to engage a sandwich and to move the engaged sandwich to a sandwich discharge position when the arm 606 is moved in the first direction 640 during the operation of the apparatus 10.

When the sandwich station 78 has been moved in the direction 45 to the discharge station 80, the motor 600 is activated and conditioned to drive the arm 606 in the direction 640 via the engagement between the gear 602 and the gear track 644. The motor 600 will continue to drive the arm 606 in the direction 640 until the sandwich on the sandwich station 78 has been moved to the sandwich discharge position. In response to the arm 606 being positioned in the discharge position, the motor 600 is activated in a condition wherein the motor 600 drives the arm 606 in the direction 642 toward the non-operative position. When the arm 606 is re-positioned in the non-operative position, the motor 600 is de-activated or turned off.

DRIVE ASSEMBLY

As shown more clearly in FIGS. 2 and 17, a plurality of legs 700 are spaced circumferentially about the upper and the lower supports 12 and 20. Each leg 700 has a ball caster 702 connected to one end and each leg 700 is connected to the cam track 224 and to the upper support 12. Thus, the entire assembly is rollingly supported on the ball casters 702 so the assembly can be conveniently moved from one location to another. One end of a support shaft 704 is connected to a central portion of the cam track 224, the support shaft 704 extending through an opening 706 formed through a central portion of the lower support 20 and extending through an opening 708 formed through a central portion of the upper support 12. The support shaft 704 is secured to the cam track 224 and to the upper support 12. The lower support 20 is rotatingly supported via a plurality of rollers 710, each of the rollers 710 being secured to one of the legs 700.

A pulley wheel 712 is connected to the support shaft 704, generally between the lower support 20 and the cam track 224. A drive motor 714 is supported on the cam track 224 and a pulley wheel 716 is connected to one end of the shaft of the drive motor 714. An endless belt 718 is operatively connected to the pulley wheels 712 and 716. Thus, when the drive motor 714 is activated, the lower support 20 is rotated via the driving connection provided via the pulley wheels 712 and 716 and the endless belt 718.

CONTROL SYSTEM

The control of the various components of the apparatus 10 is schematically and diagramatically illustrated in FIG. 12. In FIG. 12, the solenoid 352 of the first spreadable material dispenser 42 is designated 352A and the solenoid 352 of the second spreadable material dispenser 46 is designated 352B for the purpose of identification. Further, the solenoid 462 of the first rough material dispenser 54 is designated 452A, the solenoid 462 of the second rough material dispenser 60 is designated 462B, the solenoid 462 of the third rough material dispenser 64 is designated 462C and the solenoid 462 of the fourth rough material dispenser 68 is designated 462D for the purpose of identification.

The various components of the apparatus 10 are connected to an electrical power supply 750 via an on/off switch 752. In the open position of the switch 752 as shown in FIG. 12, electrical continuity is interrupted between the electrical power supply 750 and the components of the apparatus 10, the switch 752 operating to establish electrical continuity between the electrical power supply and the various components of the apparatus 10 in the closed position.

The switch 82 is normally closed and is interposed between the solenoid 352A of the first spreadable material dispenser 42 and the switch 752. The switch 84 is a normally closed type of electrical switch and is interposed between the solenoid 352B of the second spreadable dispenser 46 and the switch 752. The switch 86 is a normally closed type of electrical switch and is interposed between the solenoid 462A of the first rough material dispenser 54 and the switch 752. The switch 88 is a normally closed type of electrical switch and is interposed between the solenoid 462B of the second rough material dispenser 60 and the switch 752. The switch 90 is a normally closed type of electrical switch and is interposed between the solenoid 462C of the third rough material dispenser 64 and the switch 752. The switch 92 is a normally closed type of electrical switch and is interposed between the solenoid 462D of the fourth rough material dispenser 68 and the switch 752.

Thus, when the switch 752 is moved to the closed position, electrical continuity is established between the electrical power supply 750 and the first and the second spreadable material dispenser solenoids 352A and 352B and the first, the second, the third and the fourth rough material dispenser solenoids 462A, 462B, 462C and 462D, thereby energizing the solenoids 352A, 352B, 462A, 462B, 462C and 462D. In the energized condition of the solenoids 352A and 352B, the bins 300 of the first and the second spreadable material dispensers 42 and 46 are each positioned in the non-operative position wherein the outer peripheral surface of the roll member 326 is spaced the predetermined distance above the upper surface 22 of the lower support 20 for allowing any sandwich portion to pass under the roll member 326 without being engaged by the roll member 326 or, in other words, in this condition spreadable material will not be dispensed from the dispensers 42 and 46 as the sandwich station 76 is moved through the dispensing stations 98 and 100. Further, the solenoids 462A, 462B, 462C and 462D are each energized thereby positioning the first, the second, the third and the fourth rough material dispensers 54, 60, 64 and 68 in the non-operative position wherein each of the activating flanges 442 are spaced the predetermined distance from the upper surface 22 of the lower support 20 so that the bar 470 will not engage any portion of the activating flanges 470 as the sandwich station 78 is moved through the dispensing stations 106, 108, 110 and 112 and thus rough material will not be dispensed from the dispensers 54, 60, 64 and 68 as the sandwich station 78 is moved through the dispensing stations 106, 108, 110 and 112.

When any one of the switches 82, 84, 86, 88, 90 or 92 is depressed, the depressed switch is moved to the open position thereby de-energizing the solenoid connected thereto. In the de-energized condition of the solenoid 352A, the bin 300 of the first spreadable material dispenser 42 is moved to the operative or dispensing position wherein the lowermost portion of the outer peripheral surface of the roll member 326 is spaced a distance from the upper surface 22 of the lower support 20 for positioning the roll member 326 to engage a sandwich portion passing under the roll member 326 of the first spreadable material dispenser 42 thereby dispensing spreadable material onto the sandwich portion as the sandwich station 78 is moved through the dispensing station 98. In the energized condition of the solenoid 352B, the bin 300 of the second spreadable material dispenser 46 is positioned in the operative dispensing position wherein the outer peripheral surface of the roll member 326 thereof is spaced a distance from the upper surface 22 of the lower support 20 for positioning the roll member 326 to engage a sandwich portion passing under the roll member 326 of the dispenser 46 thereby dispensing spreadable material onto the sandwich portion as the sandwich station 78 is moved through the dispensing station 100.

In the energized condition of the solenoid 462A of the first rough material dispenser 54 the bin 400 of the first rough material dispenser 54 is positioned in the operative or dispensing position wherein the activating flanges 442 are spaced a distance from the upper surface 22 of the support 20 so that the bar 470 will engage the activating flange 442 as the sandwich station 78 is moved through the dispensing station 106, causing the paddle members 428 to be rotated thereby dispensing rough material from the dispenser 54 onto a sandwich portion disposed on the sandwich station 78 moves through the dispensing station 106. In the de-energized condition of the solenoid 462B, the bin 400 of the second rough material dispenser 60 is positioned in the operative or dispensing position wherein the activating flanges 442 are spaced a distance from the upper surface 22 of the lower support 20 so that the bar 470 will engage the activating flanges 442 as the sandwich station 78 is moved through the dispensing station 108 causing the paddle members 428 to be rotated thereby dispensing rough material from the dispenser 60 onto a sandwich portion disposed on the sandwich station 78 moving through the dispensing station 108. In the de-energized condition of the solenoid 462C, the bin 400 of the third rough material dispenser 64 is positioned in the operative dispensing position wherein the activating flanges 442 are spaced a distance above the upper surface 22 of the lower support 20 so that the bar 470 will engage the activating flanges 442 as the sandwich station 78 is moved through the dispensing station 110 causing the paddle members 428 to be rotated, thereby dispensing rough material from the dispenser 64 onto a sandwich portion disposed on the sandwich station 78 moving through the dispensing station 110. In the de-energized condition of the solenoid 462D, the bin 400 of the fourth rough material dispenser 68 is positioned in the operative or dispensing position wherein the activating flanges 442 are spaced a distance above the upper surface 22 of the lower support so that the bar 470 will engage the activating flanges 442 as the sandwich station 78 is moved through the dispensing station 112 causing the paddle members 428 to be rotated thereby dispensing rough material from the dispenser 68 onto a sandwich portion disposed on the sandwich station 78 moving through the dispensing station 112.

The start switch 94 is a normally open type electrical switch and is interposed between the on/off switch 752 and the oven assembly motor 534, the oven assembly heating element 510 and the discharge assembly motor 600. Thus, in the closed position of the switch 752 electrical continuity is still not established between the electrical power supply 750 and the oven assembly motor 534 or the or the oven assembly heating element 510 or the discharge assembly motor 600 or the drive motor 714 since the normally open start switch 94 operates to interrupt the electrical continuity between these elements and the electrical power supply 750. When the start switch 94 is depressed or closed, electrical continuity is established between the electrical power supply 750 and the drive motor 714 thereby conditioning the drive motor 714 in an activated condition for drivingly rotating the lower support 20 in the first direction 45.

The oven assembly motor 534 is connected to the start switch 94 via a switch 756. The switch 756 is a normally open type of electrical switch and in the closed position of the switch 756 and in the closed position of the start switch 94 electrical continuity is established between the oven assembly motor 534 and the electrical power supply 750 for activating the oven assembly motor 534 in the one condition for causing the lever arms 516 and 518 to be moved in the pivotal direction 522 thereby causing the hood 500 to be moved downwardly in the direction 544 toward the upper surface 22 of the lower support 20 and toward the heating position. A switch 758 is interposed between the switch 756 and the oven assembly motor 534 and the switch 758 is a normally closed type of electrical switch. When the hood 500 has been moved in the direction 544 a predetermined distance positioning the oven assembly 40 in the heating position wherein the hood 500 is spaced a predetermined distance from the upper surface 22 of the lower support 20, the lever arm 516 engages the switch 758 causing the switch 758 to be positioned in the open position, thereby interrupting electrical continuity between the electrical power supply 750 and the oven assembly motor 534 and deactivating the oven assembly motor 534.

When the oven assembly 40 has been positioned in the heating position, a normally open switch 760 is positioned in the closed position thereby establishing electrical continuity between the electrical power supply 750 and the oven assembly heating element 510, electrical continuity being established between the electrical power supply 750 and the oven heating element via a timer 762. The timer 762 operates to maintain the electrical continuity between the electrical power supply 750 and the oven assembly heating element 510 for the predetermined heating period of time and, after the lapse of the heating period of time, the timer 510 operates to disconnect or interrupt electrical continuity between the electrical power supply 750 and the oven assembly heating element 510 by opening the switch 760. Further, the timer 510 operates to close a normally open switch 764 after the lapse of the predetermined heating period of time thereby establishing electrical continuity between a portion of the oven assembly motor 534 and the electrical power supply 750 via the switch 764 and the timer 762.

When electrical continuity is established between the oven assembly motor 534 and the electrical power supply 750 via the switch 764, the oven assembly motor 534 is activated to cause the lever arms 516 and 518 to be moved in the pivotal direction 524 thereby causing the hood 500 to be raised in the upwardly direction 548. In this condition, the hood 500 is raised in the upwardly direction 548 to a position wherein the lever arms 516 and 518 engage a switch 766 causing the switch 766 to be moved to the open position thereby disconnecting or interrupting the electrical power supply between the oven assembly motor 534 and the electrical power supply 750, the electrical continuity being interrupted when the oven assembly 40 has been repositioned in the non-operative position.

The electrical power supply 750 is connected to the discharge assembly motor 600 via switches 768, 770, 772 and 774. When the sandwich station 78 is moved to the discharge station 80, a switch 768 is closed thereby establishing electrical continuity via the switches 768 and 772 between the discharge assembly motor 600 and the electrical power supply 750. In this condition, the motor 600 drives the arm 606 in the direction 640 to a position wherein the sandwich portion on the sandwich station 78 is engaged via the sandwich engaging member 658, the motor 600 continuing to drive the arm 606 in the direction 640 until the sandwich portion on the sandwich station 78 has been moved to a sandwich discharge position.

When the arm 606 has been moved to the discharge position, the switch 772 is opened thereby interrupting electrical continuity between the discharge assembly motor 600 and the electrical power supply 750. The switch 772 is mechanically connected to the switch 774 and the switch 774 is closed when the switch 772 is opened. In the closed position of the switch 774, electrical continuity is established between the motor 600 and the electrical power supply 750 via the switches 770 and 774. In this activated condition of the motor 600, the motor 600 operates to drive the arm 606 in the direction 642 toward the non-operative position. When the arm 606 is positioned in the non-operative position, the switch 770 is opened thereby interrupting electrical continuity between the motor 600 and the electrical power supply 750.

A switch 770 is interposed between the drive motor 714 and the electrical power supply 750. When the sandwich station 78 is moved to the heating station 104, the switch 770 is opened thereby interrupting electrical continuity and causing the rotation of the lower support 20 to stop. The switch 770 remains in this position for the heating period of time and the switch 770 is closed in response to the oven assembly 40 being repositioned in the non-operative position to continue the driving rotation of the lower support 20. The switch 770 again is opened in response to the sandwich station 78 being moved to the discharge station 80.

Changes may be made in the construction and the operation of the various elements and assemblies of the apparatus 10 without departing from the spirit and the scope of the invention as defined in the following claims.

What is claimed is:

1. An apparatus for making sandwiches consisting of an upper breadpiece and a lower breadpiece and foodstuff disposed between the upper and lower breadpieces, comprising:

an upper support;

a lower support disposed near and spaced a distance from the upper support, the lower support having a sandwich station thereon;

a lower breadpiece dispenser connected to the upper support and having a portion for retaining lower breadpieces and a dispensing passageway formed through a portion thereof, a lower breadpiece being dispensable from the lower breadpiece dispenser;

a foodstuff dispenser connected to the upper support and spaced a distance from the lower breadpiece dispenser, having a portion for retaining foodstuff, the foodstuff being dispensable from the foodstuff dispenser;

an upper breadpiece dispenser connected to the upper support and spaced a distance from the foodstuff dispenser, having a portion for retaining upper breadpieces and a dispensing passageway formed through a portion thereof, an upper breadpiece being dispensable from the upper breadpiece dispenser;

a discharge assembly for moving the sandwich disposed on the sandwich station to a sandwich discharge position in a discharge station of the upper and the lower supports;

means for moving one of the upper support and the lower support to a lower breadpiece dispensing station and the lower breadpiece dispenser being disposed in a predetermined position relative to the sandwich station on the lower support in the lower breadpiece dispensing station for receiving a lower breadpiece dispensed from the lower breadpiece dispenser, and for moving one of the upper support and the lower support to a foodstuff dispensing station and the foodstuff dispenser being disposed in a predetermined position relative to the sandwich station on the lower support in the foodstuff dispensing station for dispensing the foodstuff from the foodstuff dispenser on a sandwich portion disposed on the sandwich station in the foodstuff dispensing station, and for moving one of the upper support and the lower support to an upper breadpiece dispensing station and the upper bread dispenser being disposed in a predetermined position relative to the sandwich station on the lower support in the upper breadpiece dispensing station for dispensing an upper breadpiece on a sandwich portion disposed on the sandwich station in the upper breadpiece dispensing station, and for moving one of the upper support and the lower support to the discharge station and the discharge assembly being disposed in a predetermined position relative to the sandwich station on the lower support in the discharge station for discharging a sandwich disposed on the sandwich station to the sandwich discharge position;

means for dispensing foodstuff from the foodstuff dispenser onto the sandwich portion disposed on the sandwich station in the foodstuff dispensing station of the upper and the lower supports; and means for dispensing one of the upper and the lower breadpieces from the upper and the lower breadpiece dispensers onto the sandwich station, comprising:

means for dispensing one of the lower and upper breadpieces from the lower and upper breadpiece dispensers, comprising:

a pin member having opposite ends and extending through the lower support generally near the sandwich station, the pin member being movable to a dispensing position wherein a portion of the pin member generally near one end thereof extends into the dispensing passageway formed in the upper and the lower breadpiece dispensers, the pin member engaging one of the lower breadpieces in the lower breadpiece dispenser and moving the engaged lower breadpiece from the lower breadpiece dispenser onto the sandwich station as the sandwich station moves through the lower breadpiece dispensing station and the pin member engaging one of the upper breadpieces in the upper breadpiece dispenser and moving the engaged upper breadpiece from the upper breadpiece dispenser onto the sandwich station as the sandwich station moves through the upper breadpiece dispensing station;

a cam roller journally connected to the end of the pin member generally opposite the end portion of the pin member engagable with the lower breadpiece; and a cam surface spaced a distance from the lower support for positioning the pin member, the cam roller rollingly engaging the cam surface during the movement of one of the upper and the lower supports, the cam surface being positioned to move the pin member to the dispensing position via the engagement between the cam roller and the cam surface in the lower breadpiece dispensing station of the upper and the lower supports and the cam surface being positioned to move the pin to the dispensing position via the engagement between the cam roller and the cam surface in the upper breadpiece dispensing station of the upper and the lower supports.

2. The apparatus of claim 1 defined further to include:
an oven assembly connected to the upper support and spaced a distance from the lower breadpiece dispenser, the oven assembly emitting heat in a heating condition thereof; and wherein the means for moving one of the upper support and the lower support is defined further as moving one of the upper support and the lower support to a heating station and the oven assembly being disposed in a predetermined position relative to the lower support in the heating station, the sandwich station being disposed relative to the oven assembly for heating a space generally near the sandwich station in the heating station; and wherein the apparatus is defined further to include:
means for conditioning the oven assembly in the heating condition for heating a sandwich portion disposed on the sandwich station in the heating station of the upper and the lower supports and in a heating condition of the oven assembly.

3. The apparatus of claim 1 wherein the foodstuff dispenser is defined further to include:
a filler material dispenser connected to the upper support and spaced a distance from the lower breadpiece dispenser, having a portion for retaining filler material, the filler material being dispensable from the filler material dispenser; and wherein the means for moving one of the upper support and the lower support is defined further as moving one of the upper support and the lower support to a filler material dispensing station and the filler material dispenser being positioned in a predetermined position relative to the sandwich station on the lower support in the filler material dispensing station for dispensing filler material from the filler material dispenser on a sandwich portion disposed on the sandwich station in the filler material dispensing station; and wherein the means for dispensing foodstuff from the foodstuff dispenser is defined further to include:

means for dispensing filler material from the filler material dispenser onto the sandwich portion disposed on the sandwich station in the filler material dispensing station of the upper and the lower supports.

4. The apparatus of claim 1 wherein the foodstuff dispenser is defined further to include:
a spreadable material dispenser connected to the upper support and spaced a distance from the lower breadpiece dispenser, having a portion for retaining spreadable material, the spreadable material being dispensable from the spreadable material dispenser; and wherein the means for moving one of the upper support and the lower support is defined further as moving one of the upper support and the lower support to a spreadable material dispensing station and the spreadable material dispenser being positioned in a predetermined position relative to the sandwich station on the lower support in the spreadable material dispensing station for dispensing spreadable material from the spreadable material dispenser on the lower breadpiece disposed on a sandwich portion disposed on the sandwich station in the spreadable material dispensing station; and wherein the means for dispensing foodstuff from the foodstuff dispenser is defined further to include:

means for dispensing spreadable material from the spreadable material dispenser onto the sandwich portion disposed on the sandwich station in the spreadable material dispensing station of the upper and the lower supports.

5. The apparatus of claim 1 wherein the foodstuff dispenser is defined further to include:

a rough material dispenser connected to the upper support and spaced a distance from the lower breadpiece dispenser, having a portion for retaining rough material, rough material being dispensable from the rough material; and wherein the means for moving one of the upper support and the lower support is defined further as moving one of the upper support and the lower support to a rough material dispensing station and the rough material dispenser being positioned in a predetermined position relative to the sandwich station on the lower support in the rough material dispensing station for dispensing rough material from the rough material dispenser on a sandwich portion disposed on the sandwich station in the rough material dispensing station; and wherein the means for dispensing foodstuff from the foodstuff dispenser is defined further to include:

means for dispensing rough material from the rough material dispenser onto the sandwich portion disposed on the sandwich station in the rough material dispensing station of the upper and the lower supports.

6. The apparatus of claim 3 wherein the foodstuff dispenser is defined further to include:

a spreadable material dispenser connected to the upper support and spaced a distance from the lower breadpiece dispenser, having a portion for retaining spreadable material, the spreadable material being dispensable from the spreadable material dispenser; and wherein the means for moving one of the upper support and the lower support is defined further as moving one of the upper support and the lower support to a spreadable material dispensing station and the spreadable material dispenser being positioned in a predetermined position relative to the sandwich station on the lower support in the spreadable material dispensing station for dispensing spreadable material dispensed from the spreadable material dispenser on the lower breadpiece disposed on a sandwich portion disposed on the sandwich station in the spreadable material dispensing station; and wherein the means for dispensing foodstuff from the foodstuff dispenser is defined further to include:

means for dispensing spreadable material from the spreadable material dispenser onto the sandwich portion disposed on the sandwich station in the spreadable material dispensing station of the upper and the lower supports.

7. The apparatus of claim 3 wherein the foodstuff dispenser is defined further to include:

a rough material dispenser connected to the upper support and spaced a distance from the lower breadpiece dispenser, having a portion for retaining rough material, rough material being dispensable from the rough material dispenser; and wherein the means for moving one of the upper support and the lower support is defined further as moving one of the upper support and the lower support to a rough material dispensing station and the rough material dispenser being positioned in a predetermined position relative to the sandwich station on the lower support in the rough material dispensing station for dispensing rough material from the rough material dispenser on a sandwich portion disposed on the sandwich station in the rough material dispensing station; and wherein the means for dispensing foodstuff from the foodstuff dispenser is defined further to include:

means for dispensing rough material from the rough material dispenser onto the sandwich portion disposed on the sandwich station in the rough material dispensing station of the upper and the lower supports.

8. The apparatus of claim 4 wherein the foodstuff dispenser is defined further to include:

a rough material dispenser connected to the upper support and spaced a distance from the lower breadpiece dispenser, having a portion for retaining rough material, rough material being dispensable from the rough material dispenser; and wherein the means for moving one of the upper support and the lower support is defined further as moving one of the upper support and the lower support to a rough material dispensing station and the rough material dispenser being positioned in a predetermined position relative to the sandwich station on the lower support in the rough material dispensing station for dispensing rough material from the rough material dispenser on a sandwich portion disposed on the sandwich station in the rough material dispensing station; and wherein the means for dispensing foodstuff from the foodstuff dispenser is defined further to include:

means for dispensing rough material from the rough material dispenser onto the sandwich portion disposed on the sandwich station in the rough material dispensing station of the upper and the lower supports.

9. The apparatus of claim 8 wherein the foodstuff dispenser is defined further to include:

a filler material dispenser connected to the upper support and spaced a distance from the lower breadpiece dispenser, having a portion for retaining filler material, the filler material being dispensable from the filler material dispenser; and wherein the means for moving one of the upper support and the lower support is defined further as moving one of the upper support and the lower support to a filler material dispensing station and the filler material dispenser being positioned in a predetermined position relative to the sandwich station on the lower support in the filler material dispensing station for dispensing filler material from the filler material dispenser on a sandwich portion disposed on the sandwich station in the filler material dispensing station; and wherein the means for dispensing foodstuff from the foodstuff dispenser is defined further to include:

means for dispensing filler material from the filler material dispenser onto the sandwich portion disposed on the sandwich station in the filler material dispensing station of the upper and the lower supports.

10. The apparatus of claim 1 wherein the lower breadpiece dispenser is further defined to include:

a first retainer having an upper end and a lower end, the first retainer having an opening extending therethrough intersecting the upper and the lower ends thereof, the opening being shaped to retain a plurality of lower breadpieces generally between the upper and the lower ends thereof;

a first flange connected to the first retainer and extending a distance from the lower end of the first retainer, a portion of the first flange forming a portion of the ledge; and a second flange connected to the first retainer and extending a predetermined distance from the lower end of the first retainer, the second flange being spaced from the first flange and the space between the first and the second flanges forming a dispensing passageway, a portion of the second flange forming a ledge and the ledges of the first and the second flanges cooperating to support the lower breadpieces within the opening in the first retainer; and means for connecting the first retainer to the upper support and for supporting the first retainer in a position wherein the lower end of the first retainer is spaced a predetermined distance from the sandwich station on the lower support in the lower breadpiece dispensing station of the upper and the lower supports.

11. The apparatus of claim 10 wherein the lower breadpiece dispenser is defined further to include:

a second retainer having an upper end and a lower end, the second retainer having an opening extending therethrough intersecting the upper and the lower ends thereof, the opening being shaped to retain a plurality of lower breadpieces generally between the upper and the lower ends thereof, the opening through the first retainer being larger than the opening through the second retainer for retaining different size lower breadpieces in the first and the second retainers;

a first flange connected to the second retainer and extending a distance from the lower end of the second retainer, a portion of the first flange forming a portion of the ledge;

a second flange connected to the second retainer and extending a predetermined distance from the lower end of the second retainer, the second flange being spaced from the first flange and the space between the first and the second flanges forming a dispensing passageway, a portion of the second flange forming a ledge and the ledges of the first and the second flanges cooperating to support the lower breadpieces within the opening in the second retainer; and means for connecting the second retainer to the upper support and for supporting the second retainer in a position wherein the lower end of the second retainer is spaced a predetermined distance from the sandwich station on the lower support in the lower breadpiece dispensing station of the upper and the lower supports.

12. The apparatus of claim 1 wherein the upper breadpiece dispenser is defined further to include:

a first retainer having an upper end and a lower end, the first retainer having an opening extending therethrough intersecting the upper and the lower ends thereof, the opening being shaped to retain a plurality of upper breadpieces generally between the upper and the lower ends thereof;

a first flange connected to the first retainer and extending a distance from the lower end of the first retainer, a portion of the first flange forming a portion of the ledge;

a second flange connected to the first retainer and extending a predetermined distance from the lower end of the first retainer, the second flange being spaced from the first flange and the space between the first and the second flanges forming a dispensing passageway, a portion of the second flange forming a ledge and the ledges of the first and the second flanges cooperating to support the upper breadpieces within the opening in the firsr retainer; and means for connecting the first retainer to the upper support and for supporting the first retainer in a position wherein the lower end of the first retainer is spaced a predetermined distance from the sandwich station on the lower support in the upper breadpiece dispensing station of the upper and the lower supports; and wherein the cam surface is defined further as being positioned to move the pin to the dispensing position via the engagement between the cam roller and the cam surface and the position of the cam surface in the upper breadpiece dispensing station of the upper and the lower supports.

13. The apparatus of claim 12 wherein the foodstuff dispenser is defined further to include:

a filler material dispenser connected to the upper support and spaced a distance from the lower breadpiece dispenser, having a portion for retaining filler material, filler material being dispensable from the filler material dispenser, the filler material dispenser comprising:

a first retainer having an upper end and a lower end, the first retainer having an opening extending therethrough intersecting the upper and the lower ends thereof, the opening being shaped to retain a plurality of filler material pieces generally between the upper and the lower ends thereof;

a first flange connected to the first retainer and extending a distance from the lower end of the first retainer, a portion of the first flange forming a portion of the ledge;

a second flange connected to the first retainer and extending a predetermined distance from the lower end of the the first retainer, the second flange being spaced from the first flange and the space between the first and the second flanges forming a dispensing passageway, a portion of the second flange forming a ledge and the ledges of the first and the second flanges cooperating to support the filler material pieces within the opening in the first retainer; and means for connecting the first retainer to the upper support and for supporting the first retainer in a position wherein the lower end of the first retainer is spaced a predetermined distance from the sandwich station on the lower support in a filler material dispensing station of the upper and the lower supports; and wherein the means for moving one of the upper support and the lower support is defined further as moving one of the upper support and the lower support to the filler material dispensing station and the filler material dispenser being positioned in a predetermined position relative to the sandwich station on the lower support in the filler material dispensing station for dispensing filler material from the filler material dispenser on a sandwich portion disposed on the sandwich station in the filler material dispensing station; and wherein the means for dispensing foodstuff from the foodstuff dispenser is defined further to include:

means for dispensing filler material from the filler material dispenser onto the sandwich portion disposed on the sandwich station in the filler material dispensing station of the upper and the lower supports.

14. The apparatus of claim 13 wherein the means for dispensing filler material from the filler material dispenser is defined further to include the pin member, a portion of the pin member being positionable in the dispensing position for disposing a portion of the pin member within the dispensing passageway of the filler material dispenser, the pin member engaging one of the filler material pieces in the filler material dispenser and moving the engaged filler material piece from the filler material dispenser onto the sandwich station as the sandwich station moves through the filler material dispensing station; and wherein the cam surface is defined further as being positioned to move the pin member to the dispensing position via the engagement between the cam roller and the cam surface and the positions of the cam surface in the filler material dispensing station of the upper and the lower supports.

15. The apparatus of claim 12 wherein the filler material dispenser is defined further to include:

a second retainer having an upper end and a lower end, the second retainer having an opening extending therethrough intersecting the upper and the lower ends thereof, the opening being shaped to retain a plurality of filler material pieces generally between the upper and the lower ends thereof, the opening through the first retainer being smaller than the opening through the second retainer for retaining different size filler material pieces in the first and the second retainers;

a first flange connected to the second retainer and extending a distance from the lower end of the second retainer, a portion of the first flange forming a portion of the ledge;

a second flange connected to the second retainer and extending a predetermined distance from the lower end of the second retainer, the second flange being spaced from the first flange and the space between the first and the second flanges forming a dispensing passageway, a portion of the second flange forming a ledge and the ledges of the first and the second flanges cooperating to support the filler material pieces within the opening in the second retainer; and means for connecting the second retainer to the upper support and for supporting the second retainer in a position wherein the lower end of the second retainer is spaced a predetermined distance from the sandwich station on the lower support in the filler material piece dispensing station of the upper and the lower supports.

16. The apparatus of claim 1 wherein the discharge assembly is defined further to include:

an arm having opposite ends;

a sandwich engaging member connected to one end portion of the arm;

means supporting the arm for movement in a first direction and in a second direction, the arm being movable in the first direction for engaging the sandwich disposed on the sandwich station via the sandwich engaging member connected to the arm and moving the sandwich to a sandwich discharge position in a discharge position of the arm, and the arm being movable in the second direction generally from the discharge position toward a non-operative position;

means for drivingly moving the arm in the first direction in one condition and in the second direction in one other condition; and means for conditioning the means for drivingly moving the arm in the condition for moving the arm in the first direction to the discharge position in response to the sandwich station being moved to the discharge station, and for conditioning the means for drivingly moving the arm in the condition for moving the arm in the second direction to the non-operative position in response to the arm being positioned in the discharge position.

17. The apparatus of claim 16 wherein the means for drivingly moving the arm in the first and the second directions is defined further to include:

a gear track connected to the arm and extending a distance generally between the opposite ends of the arm;

a gear having a portion meshingly engaging the gear track; and a reversible motor connected to the gear for drivingly rotating the gear in one direction in one activated condition of the motor thereby driving the arm in the first direction via the meshing engagement between the gear and the gear track, and for drivingly rotating the gear in another direction in another activated condition of the motor thereby driving the arm in the second direction via the meshing engagement between the gear and gear track.

18. The apparatus of claim 1 wherein the means for moving one of the upper support and the lower support is defined further to include:

a support shaft connected to the lower support;

a pulley wheel connected to the support shaft;

a drive motor;

a pulley wheel connected to the drive motor; and an endless belt operatively connected to the pulley wheels, the lower support being rotated in an activated condition of the drive motor via the connection between the drive motor and the lower support provided via the support shaft, the pulley wheels and the endless shaft.

19. The apparatus of claim 4 wherein the spreadable material dispenser is defined further to include:

a bin having an upper end, a lower end and an opening extending a distance therethrough intersecting the lower end thereof forming a discharge opening, the opening forming an interior space in the bin for receiving and retaining spreadable material and the bin being movable to a dispensing position and a non-operative position;

means disposed near the discharge opening in the bin for discharging a portion of the spreadable material from the interior space within the bin through the discharge opening in the bin in response to the sandwich station being moved through the spreadable material dispensing station and in the dispensing position of the bin; and means connected to the bin for moving the bin in one direction generally from the non-operative position toward the dispensing position and for moving the bin in an opposite direction generally from the dispensing position toward the non-operative position.

20. The apparatus of claim 19 wherein the means for discharging a portion of the spreadable material from the spreadable material dispenser is defined further to include:
- a generally cylindrically shaped roll member having opposite ends and an outer peripheral surface; and
- means for journally supporting the roll member within the discharge opening in the bin, a portion of the outer peripheral surface of the roll member being disposed within the interior space in the bin and engaged by the spreadable material disposed therein for disposing some of the spreadable material on the outer peripheral surface of the roll member, and the spreadable material disposed on the outer peripheral surface of the roll member being discharged from within the interior space in the bin via the rotation of the roll member; and wherein the means for moving the bin to the dispensing position and to the non-operative position is defined further as moving the bin to the dispensing position wherein the outer peripheral surface of the roll member is disposed a predetermined first distance from the sandwich station on the lower support so the outer peripheral surface of the roll member engages a sandwich portion disposed on the sandwich portion as the sandwich station moves through the spreadable material dispensing station in the dispensing position of the bin, and as moving the bin to the non-operative position wherein the outer peripheral surface of the roll member is spaced a second predetermined distance from the sandwich station on the lower support so a sandwich portion disposed on the sandwich station passes through the spreadable material station without being engaged via the roll member.

21. The apparatus of claim 19 wherein a door opening is formed through a portion of the bin generally near the upper end thereof in communication with the interior of the bin and wherein the bin is defined further to include:
- a plurality of side panels connected to surround a substantial portion of the opening extending through the bin, the door opening being formed through one of the side panels;
- a top panel connected to one end portion of each of the side panels and forming the upper end of the bin, the top panel cooperating with the side panels to substantially surround the opening in the bin; and
- a door panel hingedly connected to the one of the side panels having the door opening therein, the door panel having an opened position and a closed position, the door panel substantially enclosing the door opening in the closed position of the door panel and access to the interior space formed via the opening in the bin being provided via the door opening in the opened position of the door panel for filling the interior space in the bin with spreadable material.

22. The apparatus of claim 5 wherein the rough material dispenser is defined further to include:
- a bin having an upper end, a lower end and an opening extending a distance therethrough intersecting the lower end thereof forming a discharge opening, the opening forming an interior space in the bin for receiving and retaining rough material and the bin being movable to a dispensing position and a non-operative position;
- means disposed near the discharge opening in the bin for discharging a portion of the rough material from the interior space within the bin through the discharge opening in the bin in response to the sandwich station being moved through the rough material dispensing station and in the dispensing position of the bin; and
- means connected to the bin for moving the bin in one direction generally from the non-operative position toward the dispensing position and for moving the bin in an opposite direction generally from the dispensing position toward the non-operative position.

23. The apparatus of claim 22 wherein the means for dispensing a portion of the rough material from the rough material dispenser is defined further to include:
- a shaft;
- at least two paddle members, each paddle member being connected to the shaft and extending a distance radially therefrom and the paddle members being spaced circumferentially about the shaft;
- means for journally supporting the shaft near the discharge opening in the bin, a portion of some of the paddle members being disposed within the interior space in the bin and some of the rough material being disposed about the paddle members, the rough material disposed about the paddle members being dispensed from within the interior space in the bin via the rotation of the shaft and the paddle members connected thereto; and
- means for rotating the shaft in response to the sandwich station being moved through the rough material dispensing station and in the dispensing position of the bin, thereby causing rough material to be dispensed onto a sandwich portion disposed on the sandwich station; and wherein the means for moving the bin to the dispensing position and to the non-operative position is defined further as moving the bin to the dispensing position wherein the paddle members are disposed a predetermined first distance from the sandwich station on the lower support for dispensing rough material onto a sandwich portion disposed on the sandwich station as the sandwich station moves through the rough material dispensing station in the dispensing position of the bin.

24. The apparatus of claim 1 wherein the foodstuff dispenser is defined further to include:
- a first spreadable material dispenser connected to the upper support and movable to a dispensing position and to a non-operative position, the first spreadable material dispenser being spaced a distance from the lower breadpiece dispenser and having a portion for retaining spreadable material, the spreadable material being dispensable from the first spreadable material dispenser in the dispensing position thereof and in a first foodstuff dispensing station of the sandwich station;
- a second spreadable material dispenser connected to the upper support and movable to a dispensing position and to a non-operative position, the second spreadable material dispenser being spaced a distance from the lower breadpiece dispenser and spaced a distance from the first spreadable material dispenser and having a portion for retaining spreadable material, spreadable material being dispensable from the second spreadable material dispenser in the dispensing position thereof and in a second foodstuff dispensing station of the sandwich station;

a filler material dispenser connected to the upper support and spaced a distance from the lower breadpiece dispenser and spaced a distance from the first and the second spreadable material dispensers, having a portion for retaining filler material, filler material being dispensable from the filler material dispenser in a third foodstuff dispensing station of the sandwich station;

a first rough material dispenser connected to the upper support and movable to a dispensing position and to a non-operative position, the first rough material dispenser being spaced a distance from the lower breadpiece dispenser and spaced a distance from the first and the second spreadable material dispensers and spaced a distance from the filler material dispenser, having a portion for retaining rough material, rough material being dispensable from the first rough material dispenser in the dispensing position thereof and in a fourth foodstuff dispensing station of the sandwich station;

a second rough material dispenser connected to the upper support and movable to a dispensing position and to a non-operative position, the second rough material dispenser being spaced a distance from the lower breadpiece dispenser and spaced a distance from the first and the second spreadable material dispensers and spaced a distance from the first rough material dispenser, having a portion for retaining rough material, rough material being dispensable from the second rough material dispenser in the dispensing position thereof and in a fifth foodstuff dispensing station of the sandwich station; and wherein the means for moving one of the upper support and the lower support is defined further as moving one of the upper support and the lower support to a first foodstuff dispensing station, the sandwich station on the lower support being disposed relative to the first spreadable material dispenser for dispensing spreadable material from the first spreadable material dispenser generally onto a lower breadpiece disposed on the sandwich station as the sandwich station moves through the first foodstuff dispensing station in the dispensing position of the first spreadable material dispenser, and for moving one of the upper support and the lower support to a second foodstuff dispensing station, the sandwich station on the lower support being disposed relative to the second spreadable material dispenser for dispensing spreadable material from the second spreadable material dispenser generally onto a lower breadpiece disposed on the sandwich station as the sandwich station moves through the second foodstuff dispensing station in the dispensing position of the second spreadable material dispenser, and for moving one of the upper support and the lower support to the third foodstuff dispensing stations, the sandwich station on the lower support being disposed relative to the filler material dispenser for dispensing filler material from the filler material dispenser generally onto a lower breadpiece disposed on the sandwich station as the sandwich station moves through the third foodstuff dispensing station in the dispensing position of the filler material dispenser, and for moving one of the upper support and the lower support to the fourth foodstuff dispensing station, the sandwich station on the lower support being disposed relative to the first rough material for dispensing rough material from the first rough material dispenser generally onto a lower breadpiece disposed on the sandwich station as the sandwich station moves through the fourth foodstuff dispensing station in the dispensing position of the first rough material dispenser, and for moving one of the upper support and the lower support to the fifth foodstuff dispensing station, the sandwich station on the lower support being disposed relative to the second rough material dispenser for dispensing rough material from the second rough material dispenser generally onto a lower breadpiece disposed on the sandwich station as the sandwich station moves through the fifth foodstuff dispensing station in the dispensing station of the second rough material dispenser; and wherein the means for dispensing foodstuff from the foodstuff dispenser is defined further to include:

means for dispensing spreadable material from the first spreadable dispenser in the dispensing position as the sandwich station moves through the first dispensing station;

means for dispensing spreadable material from the second spreadable dispenser in the dispensing position as the sandwich station moves through the second dispensing station;

means for dispensing rough material from the first rough material dispenser in the dispensing position as the sandwich station moves through the fourth foodstuff dispensing station; and means for dispensing rough material from the second rough material dispenser in the dispensing position as the sandwich station moves through the fifth foodstuff dispensing station.

25. The apparatus of claim 24 defined further to include:

means connected to the first spreadable material dispenser for positioning the first spreadable material dispenser in the dispensing position in one condition and for positioning the first spreadable material dispenser in the non-operative position in one other condition;

means connected to the second spreadable material dispenser for positioning the second spreadable material dispenser in the dispensing position in one condition and for positioning the second spreadable material dispenser in the non-operative position in one other condition;

means connected to the first rough material dispenser for positioning the first rough material dispenser in the dispensing position in one condition and for positioning the first rough material dispenser in the non-operative position in one other condition;

means connected to the second rough material dispenser for positioning the second rough material dispenser in the dispensing position in one condition and for positioning the second rough material in the non-operative position in one other condition;

means remotely located for selectively conditioning the means for positioning the first spreadable material dispenser in the one condition for positioning the first spreadable material in the dispensing position and for selectively conditioning the means for positioning the second spreadable material dispenser in the one condition for positioning the second spreadable material dispenser in the dispensing position, and for selectively conditioning the means for positioning the first rough material dispenser in the one condition for positioning the first rough material dispenser in the dispensing position, and for selectively conditioning the means for positioning the second rough material dispenser in the one condition for positioning the second rough material dispenser in the dispensing position, said means thereby remotely permitting selection of the spreadable material and the rough material to be included on a completed sandwich.

26. The apparatus of claim 1 wherein the upper support is defined further as being generally circularly shaped and the lower support is defined further as being generally circularly shaped and wherein the apparatus is defined further to include:
a support shaft connected to a central portion of the lower support; and
means for journally supporting the lower support; and
wherein the means for moving one of the upper support and the lower support is defined further as rotatingly moving the lower support on the support shaft.

27. The apparatus of claim 2 wherein the oven assembly is defined further to include:
a hood having an upper end, a lower end and an opening extending a distance therethrough intersecting the lower end thereof, the opening in the hood forming an interior space and the hood being sized to encompass a portion of the sandwich station in a heating position of the oven assembly;
a heating element connected to the hood for emitting heat in an activated condition, the heating element being positioned for emitting heat generally within a portion of the interior space in the hood formed via the opening in the hood; and
means for positioning the hood in a non-operative position with respect to the lower support and for positioning the hood in a heating position with respect to the lower support, the hood encompassing a portion of the sandwich station and the lower end of the hood being disposed near the sandwich station on the lower support in the heating position of the hood so a substantial portion of the sandwich portion disposed on the sandwich station is disposed within the interior space in the hood in the heating position of the hood, the lower end of the hood being spaced a distance from the sandwich station in the non-operative position of the hood for permitting the movement of a sandwich portion disposed on the sandwich station to be moved through the heating station.

28. The apparatus of claim 27 wherein the means for positioning the hood in the heating position and in the non-operative position is defined further to include:
at least one support rod, one end of each support rod being connected to the hood, generally near the lower end of the hood;
at least one lever arm, one end of each lever arm being connected to the end of one of the support rods, opposite the end of the support rod connected to the hood;
means connected to the lever arms and pivotally supporting the lever arms for movement in a first pivotal direction and in an opposite second pivotal direction, the hood being raised in a direction generally toward the non-operative position via the pivotal movement of the lever arms in the first pivotal direction and the hood being lowered in a direction generally toward the heating position via the pivotal movement of the lever arms in the second pivotal direction;
means connected to the lever arms for pivoting the lever arms in the first pivotal direction in one activated condition thereof and for pivoting the lever arms in the second pivotal direction in one other activated condition thereof; and
means connected to the means for pivoting the lever arms for conditioning said means in the one activated condition for moving the hood to the heating position in response to the sandwich station being moved to the heating position and for conditioning said means in the other activated condition for moving the hood to the non-operative position in response to the hood being positioned in the heating position for the predetermined heating period of time; and
wherein the means for conditioning the oven assembly in the heating condition is defined further as conditioning the oven assembly in the heating condition for the predetermined heating period of time in response to the hood being moved to the heating position.

29. An apparatus for making sandwiches consisting of an upper breadpiece and a lower breadpiece and foodstuff disposed between the upper and lower breadpieces, comprising:
an upper support;
a lower support disposed near and spaced a distance from the upper support, the lower support having a sandwich station thereon;
a lower breadpiece dispenser connected to the upper support and having a portion for retaining lower breadpieces and a dispensing passageway formed through a portion thereof, a lower breadpiece being dispensable from the lower breadpiece dispenser;
a foodstuff dispenser connected to the upper support and spaced a distance from the lower breadpiece dispenser, having a portion for retaining foodstuff, the foodstuff being dispensable from the foodstuff dispenser, comprising:
a rough material dispenser connected to the upper support and spaced a distance from the lower breadpiece dispenser, having a portion for retaining rough material, rough material being dispensable from the rough material dispenser, the rough material dispenser comprising:
a bin having an upper end, a lower end and an opening extending a distance therethrough intersecting the lower end thereof forming a discharge opening, the opening forming an interior space in the bin for receiving and retaining rough material and the bin being movable to a dispensing position and a non-operative position;
means disposed near the discharge opening in the bin for discharging a portion of the rough material from the interior space within the bin through the discharge opening in the bin in response to the sandwich station being moved through the rough material dispensing station and in the dispensing position of the bin; and
means connected to the bin for moving the bin in one direction generally from the non-operative position toward the dispensing position and for moving the bin in an opposite direction generally from the dispensing position toward the non-operative position;
an upper breadpiece dispenser connected to the upper support and spaced a distance from the foodstuff dispenser, having a portion for retaining upper breadpieces and a dispensing passageway formed through a portion thereof, an upper breadpiece being dispensable from the upper breadpiece dispenser;

a discharge assembly for moving the sandwich disposed on the sandwich station to a sandwich discharge position in a discharge station of the upper and the lower supports;

means for moving one of the upper support and the lower support to a lower breadpiece dispensing station and the lower breadpiece dispenser being disposed in a predetermined position relative to the sandwich station on the lower support in the lower breadpiece dispensing station for receiving a lower breadpiece dispensed from the lower breadpiece dispenser, and for moving one of the upper support and the lower support to a rough material dispensing station and the rough material dispenser being positioned in a predetermined position relative to the sandwich station on the lower support in the rough material dispensing station for dispensing rough material from the rough material dispenser on a sandwich portion disposed on the sandwich station in the rough material dispensing station, and for moving one of the upper support and the lower support to an upper breadpiece dispensing station and the upper bread dispenser being disposed in a predetermined position relative to the sandwich station on the lower support in the upper breadpiece dispensing station for dispensing an upper breadpiece on a sandwich portion disposed on the sandwich station in the upper breadpiece dispensing station, and for moving one of the upper support and the lower support to a discharge station and the discharge assembly being disposed in a predetermined position relative to the sandwich station on the lower support in the discharge station for discharging a sandwich disposed on the sandwich station to the sandwich discharge position;

means for dispensing one of the lower breadpieces from the lower breadpiece dispenser onto the sandwich station in the lower breadpiece dispensing station of the upper and the lower supports;

means for dispensing rough material from the rough material dispenser onto the sandwich portion disposed on the sandwich station in the rough material dispensing station of the upper and the lower supports, comprising:

a shaft;

at least two paddle members, each paddle member being connected to the shaft and extending a distance radially therefrom and the paddle members being spaced circumferentially about the shaft, the paddle members being disposed a predetermined first distance from the sandwich station on the lower support in the dispensing position of the bin for dispensing rough material onto a sandwich portion disposed on the sandwich station as the sandwich station moves through the rough material dispensing station in the dispensing position of the bin;

means for journally supporting the shaft near the discharge opening in the bin, a portion of some of the paddle members being disposed within the interior space in the bin and some of the rough material being disposed about the paddle members, the rough material disposed about the paddle members being dispensed from within the interior space in the bin via the rotation of the shaft and the paddle members connected thereto, the shaft extending a distance beyond the bin; and means for rotating the shaft in response to the sandwich station being moved through the rough material dispensing station and in the dispensing position of the bin, thereby causing rough material to be dispensed onto a sandwich portion disposed on the sandwich station, comprising:

actuating flanges connected to the portion of the shaft extending beyond the bin, the actuating flanges extending generally radially from the shaft, the actuating flanges being disposed a first predetermined distance from the lower support in the dispensing position of the bin and the actuating flanges being disposed a predetermined second distance from the lower support in the non-operative position of the bin; and an actuating pin connected to the lower support and extending a distance from the lower support toward the upper support, the actuating pin being positioned on the lower support to engage and rotate the actuating flanges thereby causing the shaft and the paddle members connected thereto to be rotated in the dispensing position of the bin and in the rough material dispensing station of the upper and the lower supports, the actuating pin passing without engaging the paddle members in the non-operative position of the bin as the sandwich station moves through the rough material dispensing station; and means for dispensing one of the upper breadpieces from the upper breadpiece dispenser onto a sandwich portion disposed on the sandwich station in the upper breadpiece dispensing station of the upper and the lower supports.

30. An apparatus for making sandwiches consisting of an upper breadpiece and a lower breadpiece and foodstuff disposed between the upper and lower breadpieces, comprising:

an upper support;

a lower support disposed near and spaced a distance from the upper support, the lower support having a sandwich station thereon;

a lower breadpiece dispenser connected to the upper support and having a portion for retaining lower breadpieces and a dispensing passageway formed through a portion thereof, a lower breadpiece being dispensable from the lower breadpiece dispenser;

a foodstuff dispenser connected to the upper support and spaced a distance from the lower breadpiece dispenser, having a portion for retaining foodstuff, the foodstuff being dispensable from the foodstuff dispenser, comprising:

a spreadable material dispenser connected to the upper support and spaced a distance from the lower breadpiece dispenser, having a portion for retaining spreadable material, the spreadable material being dispensable from the spreadable material dispenser, comprising:

a bin having an upper end, a lower end and an opening extending a distance therethrough intersecting the lower end thereof forming a discharge opening, the opening forming an interior space in the bin for receiving and retaining spreadable material and the bin being movable to a dispensing position and a non-operative position;

means disposed near the discharge opening in the bin for discharging a portion of the spreadable material from the interior space within the bin through the discharge opening in the bin in response to the sandwich station being moved through the spreadable material dispensing station and in the dispensing position of the bin, comprising:

a generally cylindrically shaped roll member having opposite ends and an outer peripheral surface; and means for journally supporting the roll member within the discharge opening in the bin, a portion of the outer peripheral surface of the roll member being disposed within the interior space in the bin and engaged by the spreadable material disposed therein for disposing some of the spreadable material on the outer peripheral surface of the roll member, and the spreadable material disposed on the outer peripheral surface of the roll member being discharged from within the interior space in the bin via the rotation of the roll member, comprising:

a shaft extending through the roll member, a portion of the shaft extending a distance from one end of the roll member and another portion of the shaft extending a distance from the opposite end of the roll member, the shaft being journally connected to the roll member;

a first rod, having opposite ends, one end of the first rod being connected to the bin and the opposite end portion of the first rod extending through a portion of the shaft generally near one end of the roll member, the first rod being slidably connected to the shaft for permitting movement of the shaft in the first and the second directions on the first rod;

a second rod, having opposite ends, one end of the second rod being connected to the bin and the opposite end portion of the second rod extending through a portion of the shaft generally near one end of the roll member opposite the end of the shaft slidably connected to the first rod, the second rod being slidably connected to the shaft for permitting movement of the shaft in the first and the second directions on the second rod;

a spring disposed about the first rod and engaging the shaft for biasing the shaft in the first direction; and a spring disposed about the second rod and engaging the shaft for biasing the shaft on the first direction, the connection between the shaft and the first and the second rods and springs cooperating to permit movement of the shaft and the roll member connected thereto in the first and the second directions during the engagement between the sandwich portion and the roll member;

an upper breadpiece dispenser connected to the upper support and spaced a distance from the foodstuff dispenser, having a portion for retaining upper breadpieces and a dispensing passageway formed through a portion thereof, an upper breadpiece being dispensable from the upper breadpiece dispenser;

a discharge assembly for moving the sandwich disposed on the sandwich station to a sandwich discharge position in a discharge station of the upper and the lower supports;

means for moving one of the upper support and the lower support to a lower breadpiece dispensing station and the lower breadpiece dispenser being disposed in a predetermined position relative to the sandwich station on the lower support in the lower breadpiece dispensing station for receiving a lower breadpiece dispensed from the lower breadpiece dispenser, and for moving one of the upper support and the lower support to a spreadable material dispensing station and the spreadable material dispenser being positioned in a predetermined position relative to the sandwich station on the lower support in the spreadable material dispensing station for dispensing spreadable material from the spreadable material dispenser on the lower breadpiece disposed on a sandwich portion disposed on the sandwich station in the spreadable material dispensing station, and for moving one of the upper support and the lower support to an upper breadpiece dispensing station and the upper bread dispenser being disposed in a predetermined position relative to the sandwich station on the lower support in the upper breadpiece dispensing station for dispensing an upper breadpiece on a sandwich portion disposed on the sandwich station in the upper breadpiece dispensing station, and for moving one of the upper support and the lower support to a discharge station and the discharge assembly being disposed in a predetermined position relative to the sandwich station on the lower support in the discharge station for discharging a sandwich disposed on the sandwich station to the sandwich discharge position;

means for dispensing spreadable material from the spreadable material dispenser onto the sandwich portion disposed on the sandwich station in the spreadable material dispensing station of the upper and the lower supports;

means for dispensing foodstuff from the foodstuff dispenser onto the sandwich portion disposed on the sandwich station in the foodstuff dispensing station of the upper and the lower supports; and means for dispensing one of the upper breadpieces from the upper breadpiece dispenser onto a sandwich portion disposed on the sandwich station in the upper breadpiece dispensing station of the upper and the lower supports.

* * * * *